United States Patent
Luo

(10) Patent No.: US 11,870,493 B2
(45) Date of Patent: Jan. 9, 2024

(54) METHOD AND SYSTEM FOR INVISIBLE LIGHT COMMUNICATION USING VISIBLE LIGHT CAMERA

(71) Applicant: GUANGDONG OPPO MOBILE TELECOMMUNICATIONS CORP., LTD., Guangdong (CN)

(72) Inventor: Jun Luo, Yokohama (JP)

(73) Assignee: GUANGDONG OPPO MOBILE TELECOMMUNICATIONS CORP., LTD.

( * ) Notice: Subject to any disclaimer, the term of this patent is extended or adjusted under 35 U.S.C. 154(b) by 29 days.

(21) Appl. No.: 17/502,576

(22) Filed: Oct. 15, 2021

(65) Prior Publication Data
US 2022/0038178 A1 Feb. 3, 2022

Related U.S. Application Data

(63) Continuation of application No. PCT/CN2019/082604, filed on Apr. 15, 2019.

(51) Int. Cl.
*H04B 10/114* (2013.01)

(52) U.S. Cl.
CPC ................. *H04B 10/114* (2013.01)

(58) Field of Classification Search
None
See application file for complete search history.

(56) References Cited

U.S. PATENT DOCUMENTS

| 7,415,212 B2 * | 8/2008 | Matsushita ............. G06F 3/002 |
| | | 398/189 |
| 8,823,494 B1 | 9/2014 | Kovitz |

(Continued)

FOREIGN PATENT DOCUMENTS

| CN | 102332952 A | 1/2012 |
| CN | 105847654 A | 8/2016 |

(Continued)

OTHER PUBLICATIONS

CN107659356A, The PLA Information Engineering University, Feb. 2, 2018, Google Patent Machine Translation (Year: 2018).*

(Continued)

*Primary Examiner* — Jai M Lee
(74) *Attorney, Agent, or Firm* — Quarles & Brady LLP

(57) ABSTRACT

In an embodiment, a communication method includes: performing a receiving method by a receiving device including a visible light camera module that is capable of capturing invisible light emitted by an invisible light signal emitter of a sending device. The receiving method includes: broadcasting a camera frame rate; capturing, by the visible light camera module, a plurality of frames at the camera frame rate, wherein each frame includes a corresponding area caused by a corresponding signal pulse of a portion of signal pulses, and the signal pulses are emitted by the invisible light signal emitter at a signal pulse rate substantially same as the camera frame rate; detecting the corresponding area in each frame; and labeling the corresponding area in each frame, to obtain a coding pattern corresponding to a signal pulse pattern, and decoding the coding pattern, to identify a data sequence.

17 Claims, 24 Drawing Sheets

(56) References Cited

U.S. PATENT DOCUMENTS

| | | | |
|---|---|---|---|
| 8,848,059 B2* | 9/2014 | Tiscareno | H04B 10/116 348/E5.09 |
| 8,879,994 B2 | 11/2014 | Brown | |
| 9,385,807 B2* | 7/2016 | Roberts | H04B 10/00 |
| 10,075,236 B2* | 9/2018 | Baggen | H05B 47/165 |
| 10,210,750 B2* | 2/2019 | Knapp | H05B 47/195 |
| 10,560,193 B2* | 2/2020 | Jang | H04B 10/114 |
| 11,309,962 B2* | 4/2022 | Van De Sluis | H04B 10/116 |
| 2011/0299857 A1 | 12/2011 | Rekimoto | |
| 2014/0270799 A1* | 9/2014 | Roberts | H04B 10/116 398/130 |
| 2015/0372754 A1 | 12/2015 | Choi et al. | |
| 2019/0007142 A1* | 1/2019 | Kido | G08C 23/04 |
| 2019/0158179 A1* | 5/2019 | Davies | H05B 45/10 |
| 2019/0280770 A1* | 9/2019 | Hicks | H04B 10/116 |
| 2020/0067623 A1* | 2/2020 | Murakami | H04J 14/0213 |
| 2021/0274090 A1* | 9/2021 | Cho | H04B 10/1149 |

FOREIGN PATENT DOCUMENTS

| | | | | |
|---|---|---|---|---|
| CN | 106063261 A | | 10/2016 | |
| CN | 107421506 A | | 12/2017 | |
| CN | 107659356 A | * | 2/2018 | ........... H04B 10/116 |
| CN | 107659356 A | | 2/2018 | |
| WO | 2011086517 A1 | | 7/2011 | |

OTHER PUBLICATIONS

Medhi, Von Neumann Architecture, 2012 (Year: 2012).*

Bui et al., Demonstration of Using Camera Communication Based Infrared LED for Uplink in Indoor Visible Light Communication, IEEE, 2016 (Year: 2016).*

International Search Report and the Written Opinion dated Jan. 17, 2020 From the International Searching Authority Re. Application No. PCTCN2019082604.

Supplementary Search Report dated Apr. 21, 2022 From the Extended European search report(EESR) of the Application No. 19925121.6.

The First Office Action dated Jul. 27, 2023 from Chinese patent application No. 201980095380.2.

* cited by examiner

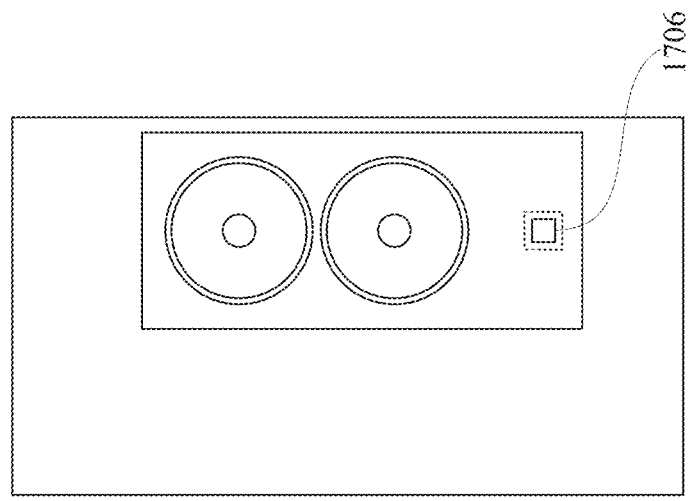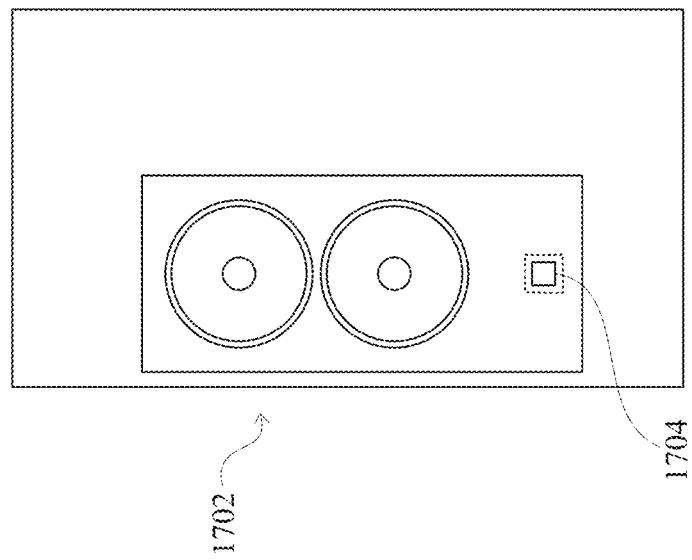
FIG. 17

METHOD AND SYSTEM FOR INVISIBLE LIGHT COMMUNICATION USING VISIBLE LIGHT CAMERA

CROSS REFERENCE TO RELATED APPLICATION

This application is a continuation of International Application No. PCT/CN2019/082604, filed Apr. 15, 2019. The application is incorporated herein by reference in their entireties.

BACKGROUND OF THE DISCLOSURE

1. Field of the Disclosure

The present disclosure relates to the field of invisible light communication, and more particularly, to a method and system for invisible light communication using a visible light camera.

2. Description of the Related Art

For visible or invisible light communication, a communication system includes a sending device which includes a visible or invisible light signal emitter that sends light pulses encoded with a data sequence, and a receiving device which includes a camera that captures frames correspondingly reflecting sampled light pulses, and at least one processor that processes the frames, to obtain the data sequence. However, when the visible light signal emitter is used, a user sees the light pulses and eyes of the user may feel uncomfortable. When the invisible light signal emitter is used, the camera is usually an invisible light camera, which may induce extra cost for the receiving device.

SUMMARY

An object of the present disclosure is to propose a method and system for invisible light communication using a visible light camera.

In a first aspect of the present disclosure, a communication method includes: performing a sending method by a sending device including a first invisible light signal emitter. The sending method includes: loading a signal pulse pattern encoded with a data sequence; scanning a camera frame rate broadcasted by a receiving device; and emitting, by the first invisible light signal emitter, first signal pulses at a signal pulse rate substantially same as the camera frame rate, wherein the signal pulse pattern is repeated in the first signal pulses.

In a second aspect of the present disclosure, a communication method includes: performing a receiving method by a receiving device including a visible light camera module that is capable of capturing invisible light emitted by a first invisible light signal emitter of a sending device. The receiving method includes: broadcasting a camera frame rate; capturing, by the visible light camera module, a plurality of first frames at the camera frame rate, wherein each first frame includes a corresponding first area caused by a corresponding signal pulse of a first portion of first signal pulses, and the first signal pulses are emitted by the first invisible light signal emitter at a signal pulse rate substantially same as the camera frame rate; detecting the corresponding first area in each first frame; and labeling the corresponding first area in each first frame, to obtain a first coding pattern corresponding to a signal pulse pattern, and decoding the first coding pattern, to identify a data sequence.

In a third aspect of the present disclosure, a communication system includes: a sending device. The sending device includes: a first invisible light signal emitter, at least one first memory, and at least one first processor. The at least one first memory is configured to store first program instructions. The at least one first processor is configured to execute the first program instructions, which cause a sending method to be performed. The sending method includes: loading a signal pulse pattern encoded with a data sequence; scanning a camera frame rate broadcasted by a receiving device; and emitting, by the first invisible light signal emitter, first signal pulses at a signal pulse rate substantially same as the camera frame rate, wherein the signal pulse pattern is repeated in the first signal pulses.

In a fourth aspect of the present disclosure, a communication system includes: a receiving device. The receiving device includes: a visible light camera module, at least one first memory, and at least one first processor. The visible light camera module is capable of capturing invisible light emitted by a first invisible light signal emitter of a sending device. The at least one first memory is configured to store first program instructions. The at least one first processor is configured to execute the first program instructions, which cause a receiving method to be performed. The receiving method includes: broadcasting a camera frame rate; capturing, by the visible light camera module, a plurality of first frames at the camera frame rate, wherein each first frame includes a corresponding first area caused by a corresponding signal pulse of a first portion of first signal pulses, wherein the first signal pulses are emitted by the first invisible light signal emitter at a signal pulse rate substantially same as the camera frame rate; detecting the corresponding first area in each first frame; and labeling the corresponding first area in each first frame, to obtain a first coding pattern corresponding to a signal pulse pattern, and decoding the first coding pattern, to identify a data sequence.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

FIG. 17 is a diagram illustrating an autofocusing step in the method for autofocusing in FIG. 15 in accordance with an embodiment of the present disclosure.

DETAILED DESCRIPTION OF THE EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the invention.

As used here, the term "using" refers to a case in which an object is directly employed for performing a step, or a case in which the object is modified by at least one intervening step and the modified object is directly employed to perform the step.

Figure 1:
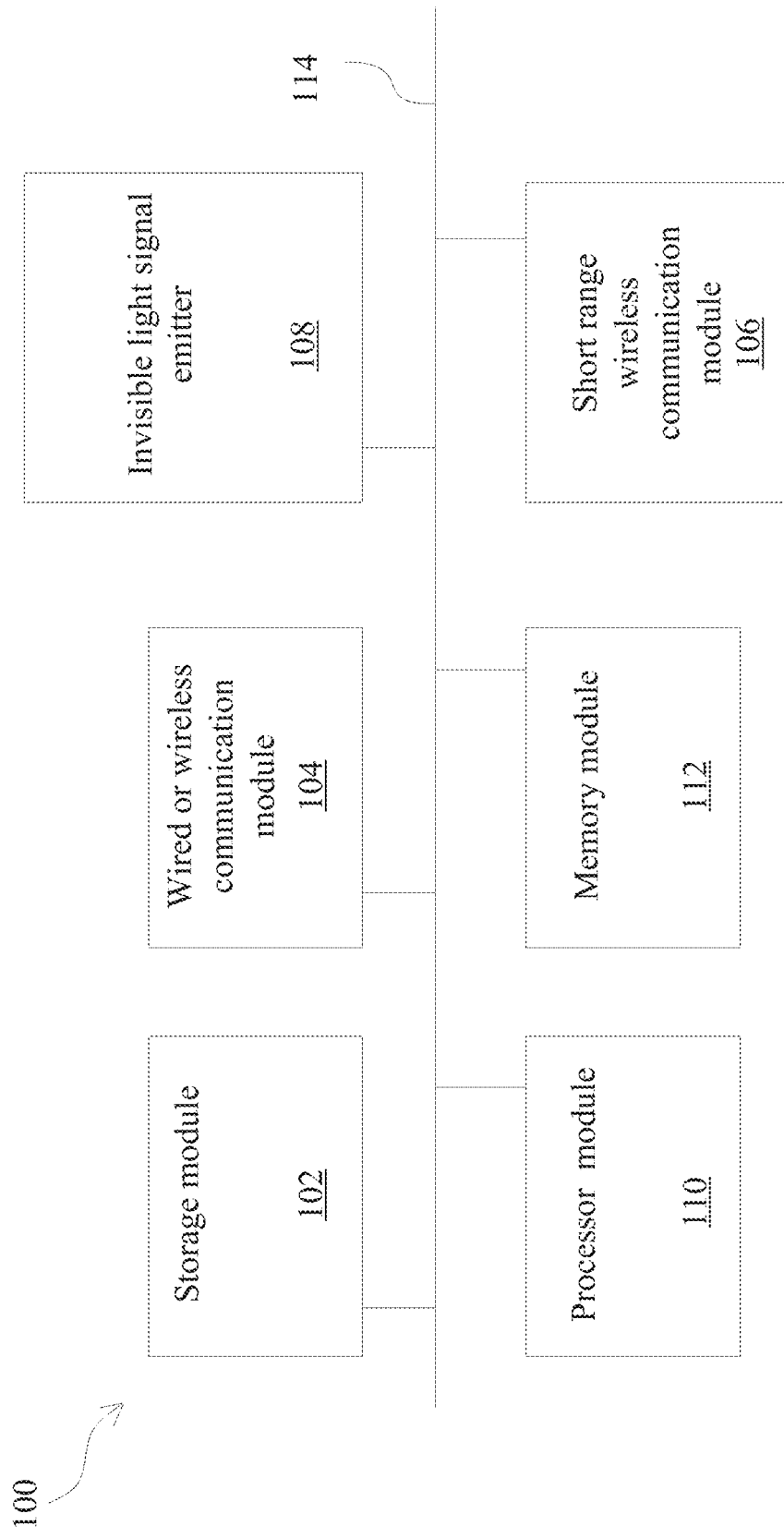
FIG. 1 is a block diagram illustrating inputting, controlling, and outputting hardware modules in a sending device in accordance with an embodiment of the present disclosure.

FIG. 1 is a block diagram illustrating inputting, controlling, and outputting hardware modules in a sending device 100 in accordance with an embodiment of the present disclosure. Referring to FIG. 1, the sending device 100 includes a storage module 102, a wired or wireless communication module 104, a short range wireless communication module 106, an invisible light signal emitter 108, a processor module 110, a memory module 112, and buses 114. The sending device 100 may be an internet-of-things (IoT) device, such as a smart home appliance, or a smart in-vehicle appliance. The smart home appliance may, for example, be a smart television (TV), a smart speaker, or a smart printer. The smart in-vehicle appliance may, for example, be a global position system (GPS) receiver, or an in-vehicle infotainment device.

The storage module 102 is an inputting hardware module and is configured to store a signal pulse pattern to be loaded in a sending method 300 to be described with reference to FIG. 3. The sending method 300 is performed by the sending device 100. The signal pulse pattern is to be transmitted to the processor module 110 using loading. Alternatively, the signal pulse pattern may be input using another inputting hardware module, such as the wired or wireless communication module 104. The wired or wireless communication module 104 is configured to receive the signal pulse pattern from a network through wired or wireless communication, and transmit the signal pulse pattern to the processor module 110 using loading.

The short range wireless communication module 106 is both an inputting hardware module and an outputting hardware module. The short range wireless communication module 106 is configured to perform the steps of scanning an advertisement message, receiving a pairing request, sending a pairing request response, and pairing with a receiving device in the sending method 300 using a short range wireless communication technology such as bluetooth low energy (BLE). The advertisement message is, for example, to be transmitted to the processor module 110. Upon receiving instructions from the processor module 110, the short range wireless communication module 106 performs communication using BLE. Alternatively, another short range wireless communication technology such as ZigBee may also be used.

The invisible light signal emitter 108 is an outputting hardware module. The invisible light signal emitter 108 is configured to emit first signal pulses in the sending method 300. Upon receiving instructions from the processor module 110, the invisible light signal emitter 108 emits the first signal pulses. Invisible light emitted by the invisible light signal emitter 108 may be infrared. Alternatively, the invisible light emitted by the invisible light signal emitter 108 may be ultraviolet.

The memory module 112 may be a transitory or non-transitory computer-readable medium that includes at least one memory storing program instructions that, when executed by the processor module 110, cause the processor module 110 to control the storage module 102, the invisible light signal emitter 108 and the short range wireless communication module 106, for the sending method 300 to be performed. The processor module 110 includes at least one processor that sends signals directly or indirectly to and/or receives signals directly or indirectly from the storage module 102, the wired or wireless communication module 104, the memory module 112, the invisible light signal emitter 108, and the short range wireless communication module 106 via the buses 114.

Figure 2:
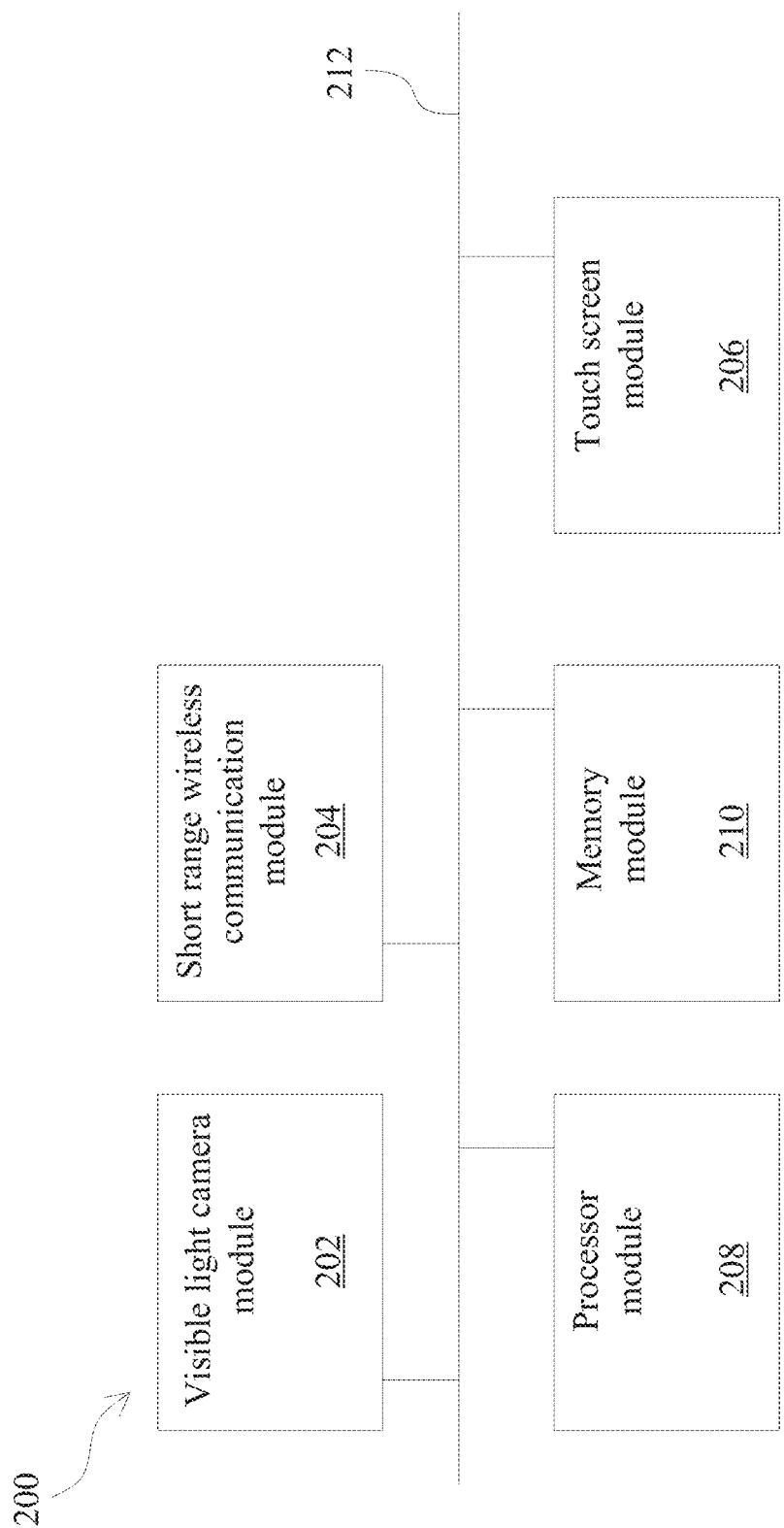
FIG. 2 is a block diagram illustrating inputting, controlling, and outputting hardware modules in a receiving device in accordance with an embodiment of the present disclosure.

FIG. 2 is a block diagram illustrating inputting, controlling, and outputting hardware modules in a receiving device 200 in accordance with an embodiment of the present disclosure. Referring to FIG. 2, the receiving device 200 includes a visible light camera module 202, a short range wireless communication module 204, a touch screen module 206, a processor module 208, a memory module 210, and buses 212. The receiving device 200 may be a terminal such as a mobile phone, a smartphone, a tablet, a notebook computer, or a desktop computer.

Figure 3:
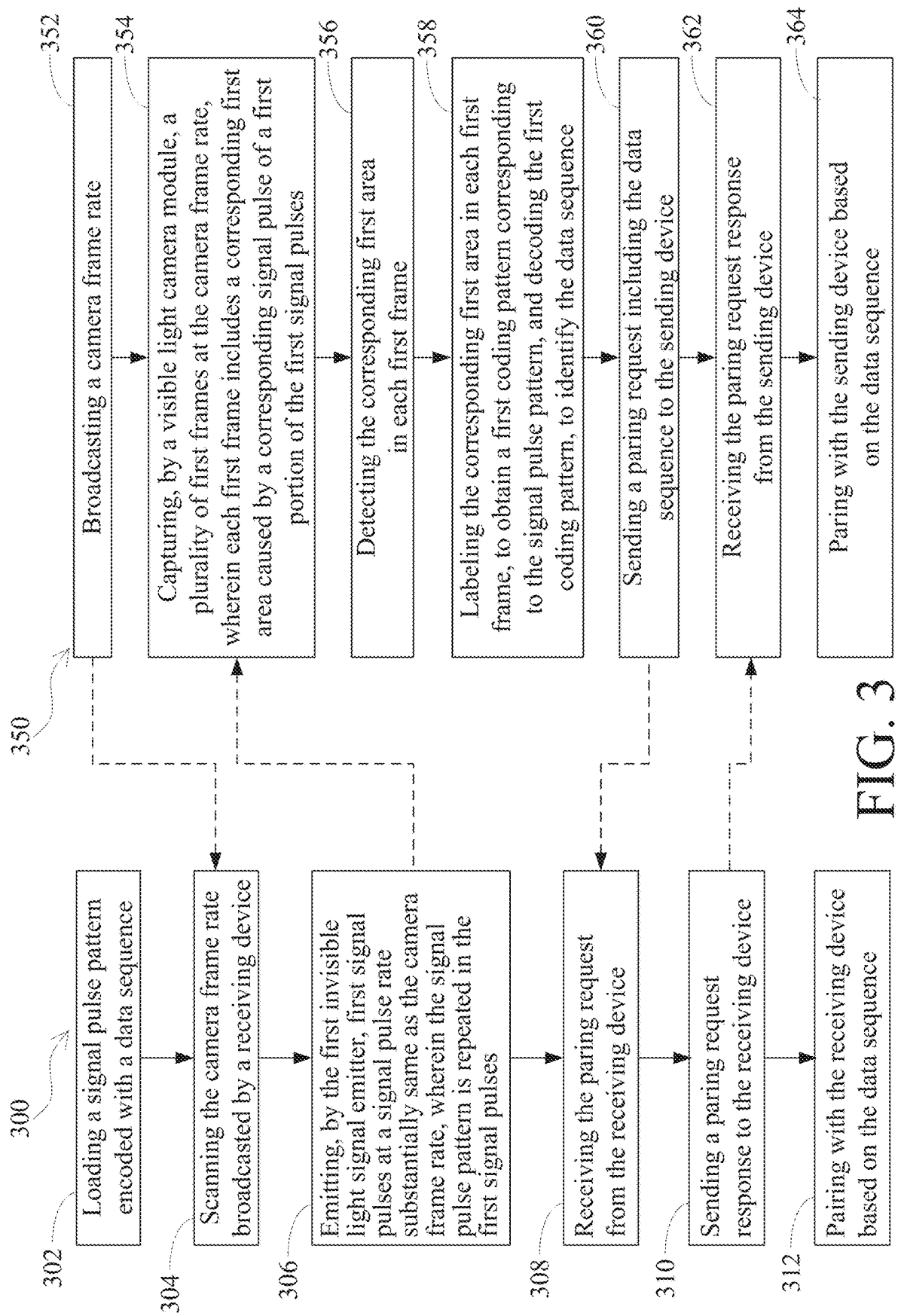
FIG. 3 is a flowchart illustrating a communication method for the sending device and the receiving device in accordance with an embodiment of the present disclosure.
Figure 10:
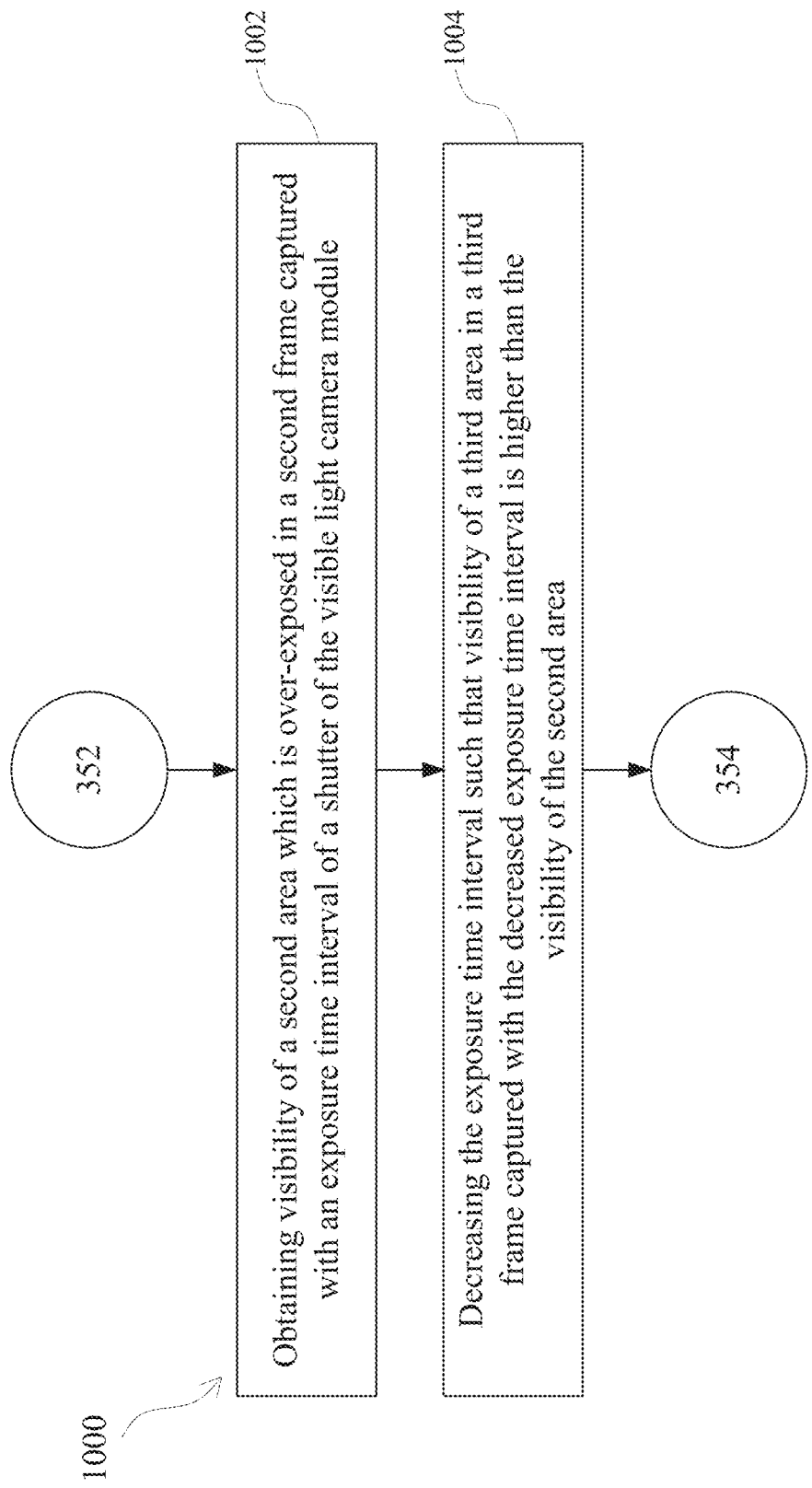
FIG. 10 is a flowchart illustrating an exposure time interval decreasing method for improving unsuccessful sampling in the situation in FIG. 9, and improving visibility of a portion of first areas in the first frames and corresponding to bright signal pulses of the first portion of the first signal pulses in accordance with an embodiment of the present disclosure.
Figure 13:
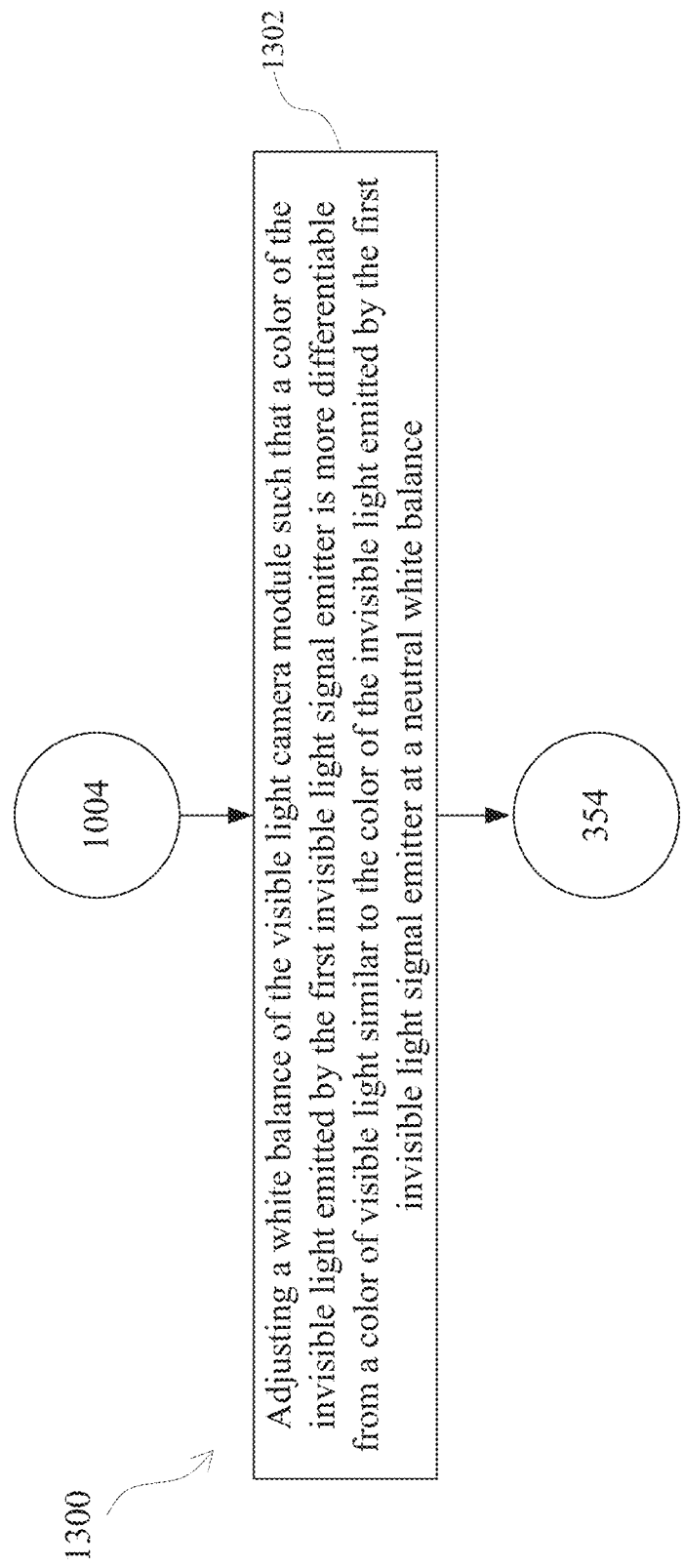
FIG. 13 is a flowchart illustrating a color conversion method for the portion of the first areas to be more differentiable from other areas in the first frames that would have a color similar to the portion of the first areas if the color conversion method 1300 was not performed in accordance with an embodiment of the present disclosure.
Figure 15:
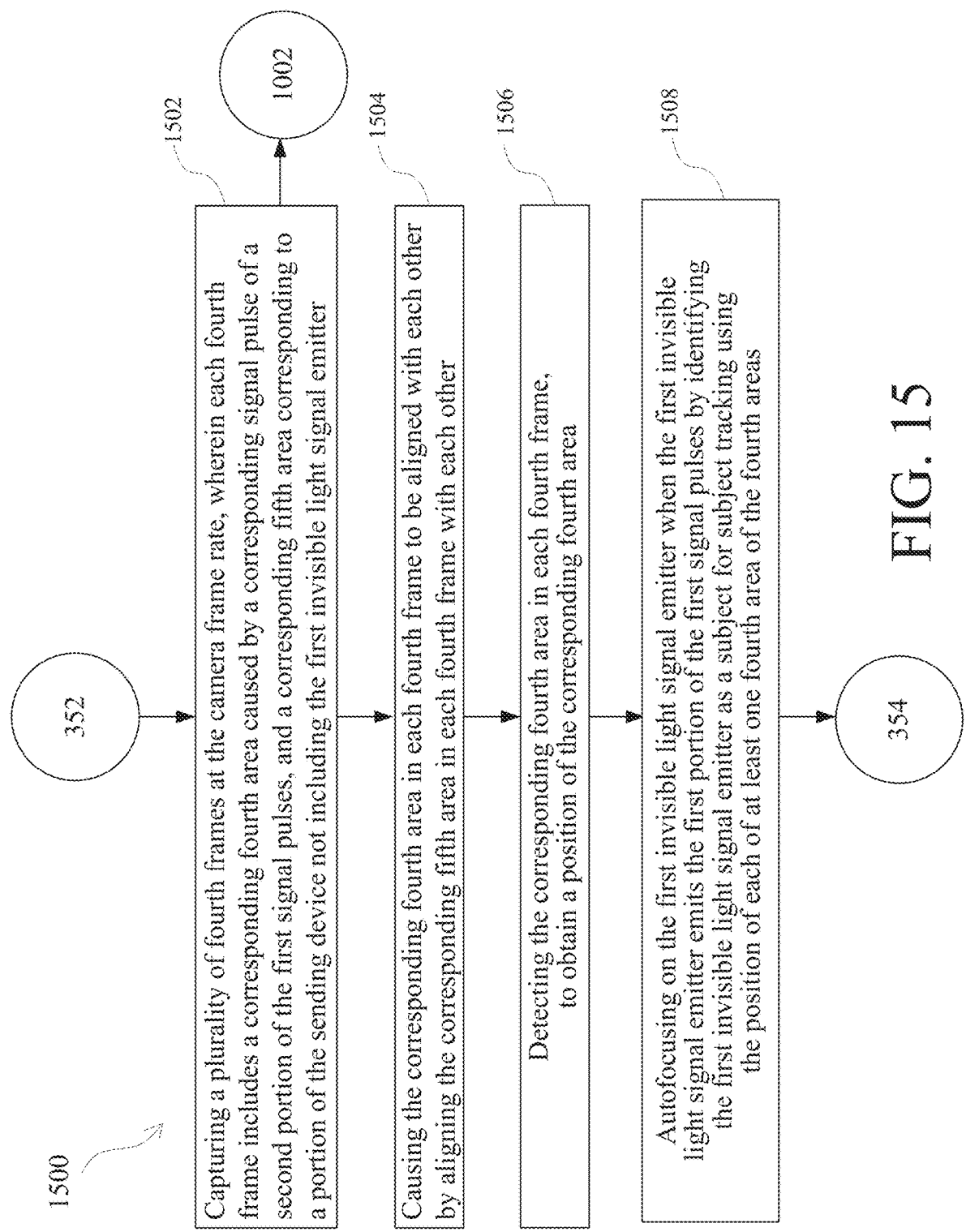
FIG. 15 is a flowchart illustrating a method for autofocusing on the first invisible light signal emitter when the first invisible light signal emitter emits the first portion of the first signal pulses in accordance with an embodiment of the present disclosure.
Figure 18:
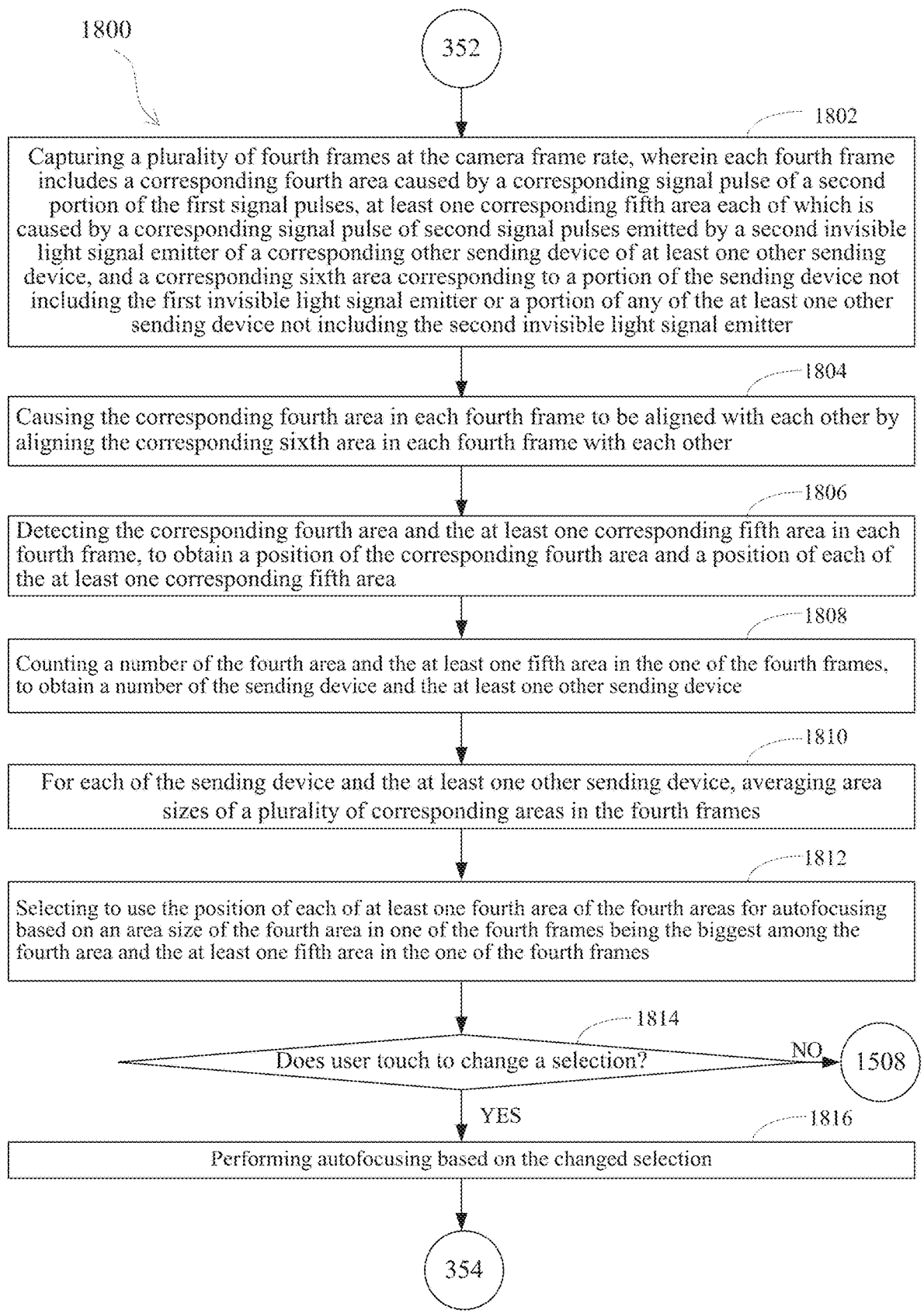
FIG. 18 is a flowchart illustrating a method for autofocusing when multiple sending devices present in accordance with an embodiment of the present disclosure.

The visible light camera module 202 is an inputting hardware module and is configured to capture frames during a receiving method 350 in FIG. 3, an exposure time interval decreasing method 1000 in FIG. 10, a color conversion method 1300 in FIG. 13, a method 1500 for autofocusing in FIG. 15, and a method 1800 for autofocusing when multiple sending devices present in FIG. 18. The receiving method 350, the exposure time interval decreasing method 1000, the color conversion method 1300, the method 1500 for autofocusing, and the method 1800 for autofocusing when multiple sending devices present are performed by the receiving device 200. At least a portion of the frames are to be transmitted to the processor module 204. The visible light camera module 202 is capable of capturing the invisible light emitted by the invisible light signal emitter 108 in FIG. 1. The visible light camera module 202 may be a color camera such as an RGB camera. Alternatively, another color camera such as a YUV camera or a Bayer raw camera may be used as the visible light camera module 202. The visible light camera module 202 includes an image sensor which has a two-dimensional photodiode (PD) array structure. The image sensor may be a charge-coupled device (CCD) image sensor or a complementary metal-oxide semiconductor (CMOS) image sensor.

The short range wireless communication module 204 is both an inputting hardware module and an outputting hardware module. The short range wireless communication module 204 is configured to perform the steps of broadcasting the advertisement message, sending the pairing request, receiving the pairing request response, and pairing with the receiving device 200 in the receiving method 350 using the short range wireless communication technology such as bluetooth low energy (BLE). The advertisement message is, for example, received from the processor module 208. Upon receiving instructions from the processor module 208, the short range wireless communication module 204 performs communication using BLE. Alternatively, another short range wireless communication technology such as ZigBee may also be used.

The touch screen module 206 is both an inputting hardware module and an outputting hardware module. The touch screen module 206 is configured to display the frames captured by the visible light camera module 202 during the sending method 350, the exposure time interval decreasing method 1000, the color conversion method 1300, the method 1500 for autofocusing, and the method 1800 for autofocusing when multiple sending devices present. Upon directly or indirectly receiving instructions from the processor module 204, the touch screen module 206 displays the frames. The touch screen module 206 is further configured to receive touch input from a user during the method 1800 for autofocusing when multiple sending devices present. The touch input may be transmitted to the processor module 204, or other modules controlled by the processor module 204 for further processing.

The memory module 210 may be a transitory or non-transitory computer-readable medium that includes at least one memory storing program instructions that, when executed by the processor module 208, cause the processor module 208 to control the visible light camera module 202, the short range wireless communication module 204, and the touch screen module 206, for the sending method 350, the exposure time interval decreasing method 1000, the color conversion method 1300, the method 1500 for autofocusing, and the method 1800 for autofocusing when multiple sending devices present to be performed. The processor module 208 includes at least one processor that sends signals directly or indirectly to and/or receives signals directly or indirectly from the visible light camera module 202, the short range wireless communication module 204, the touch screen module 206, and the memory module 210 via the buses 212. The at least one processor may be central processing unit(s) (CPU(s)), graphics processing unit(s) (GPU(s)), and/or digital signal processor(s) (DSP(s)). The CPU(s) may send the frame portions, some of the program instructions and other data or instructions to the GPU(s), and/or DSP(s) via the buses 212.

The receiving device 200 is one type of computing system all of components of which are integrated together by the buses 212. Other types of computing systems such as a computing system that has a remote camera module instead of the camera module 202 are within the contemplated scope of the present disclosure.

FIG. 3 is a flowchart illustrating a communication method for a sending device and a receiving device in accordance with an embodiment of the present disclosure. Referring to FIG. 3, the communication method includes the sending method 300 and the receiving method 350. The sending method 300 includes steps on the left of FIG. 3. The receiving method 350 includes steps on the right of FIG. 3. In step 302, a signal pulse pattern encoded with a data sequence is loaded. In step 352, a camera frame rate is broadcasted. In step 304, the camera frame rate broadcasted by the receiving device is scanned. In step 306, the first signal pulses are emitted by a first invisible light signal emitter at a signal pulse rate substantially same as the camera frame rate. The signal pulse pattern is repeated in the first signal pulses. In step 354, a plurality of first frames are captured by a visible light camera module at the camera frame rate. Each first frame includes a corresponding first area caused by a corresponding signal pulse of a first portion of the first signal pulses. In step 356, the corresponding first area in each first frame is detected. In step 358, the corresponding first area in each first frame is labeled, to obtain a first coding pattern corresponding to the signal pulse pattern, and the first coding pattern is decoded, to identify the data sequence. In step 360, the pairing request including the data sequence is sent to the sending device. In step 308, the pairing request is received from the receiving device. In step 310, the pairing request response is sent to the receiving device. In step 362, the pairing request response is received from the sending device. In step 364, the receiving device is paired with the sending device based on the data sequence. In step 312, the sending device is paired with the receiving device based on the data sequence.

The term "substantially" refers to that variation in the quantity as would be expected by the skilled artisan in view of the precision of the sending device and the receiving device used.

The sending method 300 is performed by the sending device 100 in FIG. 1. The receiving method 350 is performed by the receiving device 200 in FIG. 2.

In step 302, a signal pulse pattern encoded with a data sequence is loaded. The data sequence may be encoded into the signal pulse pattern by pulse width modulation (PWM). The signal pulse pattern may be divided into a plurality of first coding units. Each first coding unit corresponds to one bit of the data sequence and includes a plurality of bright and dark signal pulses. For each of second coding units in the first coding units that has less than 50% (e.g. 40%) of the bright and dark signal pulses that are bright, the bit of the data sequence corresponding to each of the second coding units is "0". For each of third coding units in the first coding units that has more than 50% (e.g. 60%) of the bright and dark signal pulses that are bright, the bit of the data sequence corresponding to each of the third coding units is "1". Alternatively, another percentage threshold such as 40% or 60% below which a coding unit corresponds to "0" and above which the coding unit corresponds to "1" may be used.

In step 352, a camera frame rate is broadcasted. In step 304, the camera frame rate broadcasted by the receiving device is scanned. Normally, the visible light camera module 202 has a few options for the camera frame rate, such as 30 frames per second (fps), or 60 fps. The camera frame rate broadcasted is the camera frame rate that will be used for capturing frames during the receiving method 350, the exposure time interval decreasing method 1000 in FIG. 10, a color conversion method 1300 in FIG. 13, a method 1500 for autofocusing in FIG. 15, and a method 1800 for autofocusing when multiple sending devices present in FIG. 18. The step 352 and the step 304 are a first hand-shake between the sending device 100 and the receiving device 200 using the short range wireless communication technology.

Figure 4:
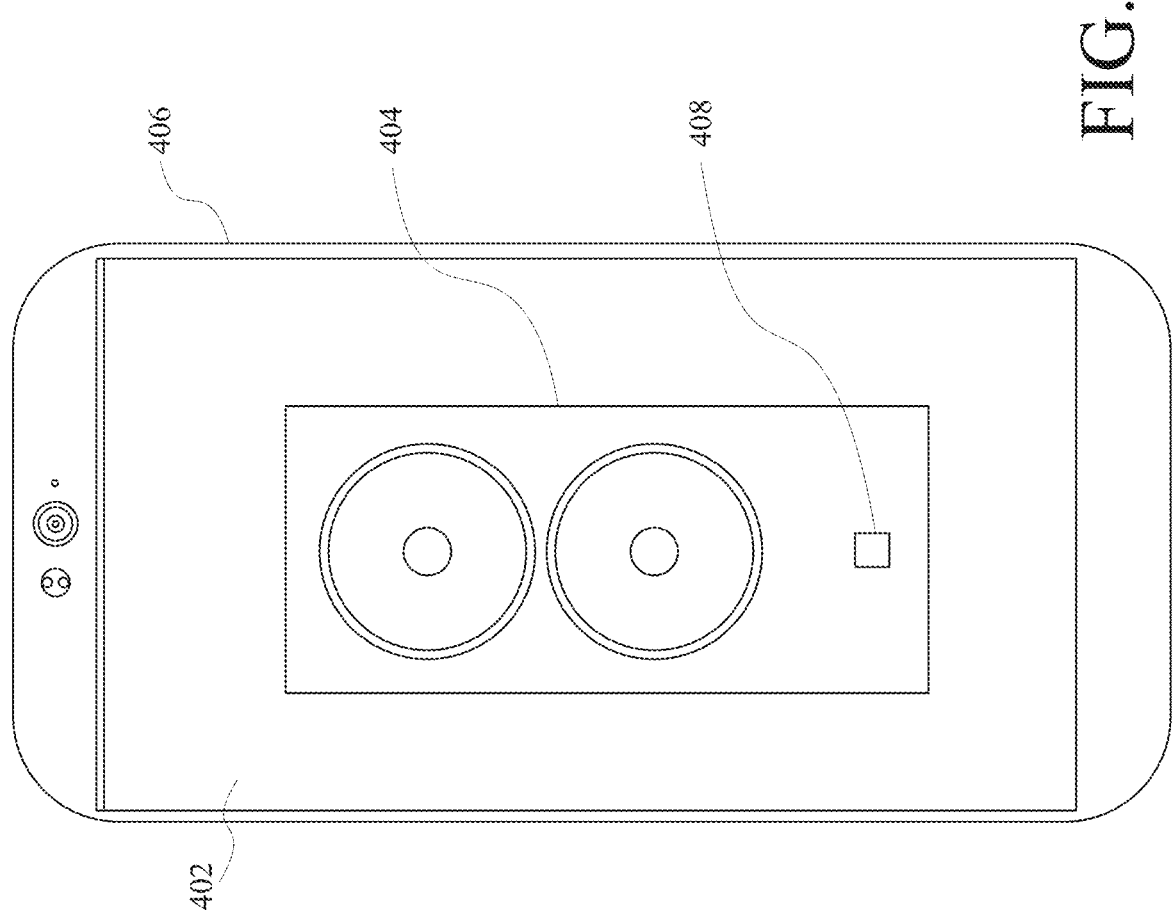
FIG. 4 is a diagram illustrating one of the first frames captured by a visible light camera module of the receiving device in accordance with an embodiment of the present disclosure.

In step 306, the first signal pulses are emitted by a first invisible light signal emitter at a signal pulse rate substantially same as the camera frame rate. The signal pulse pattern is repeated in the first signal pulses. In step 354, a plurality of first frames are captured by a visible light camera module at the camera frame rate. Each first frame includes a corresponding first area caused by a corresponding signal pulse of a first portion of the first signal pulses. The first invisible light signal emitter may be the invisible light signal emitter 108 in FIG. 1. The visible light camera module may be the visible light camera module 202 in FIG. 2. FIG. 4 is a diagram illustrating one 402 of the first frames captured by the visible light camera module 202 of the receiving device 200 in accordance with an embodiment of the present disclosure. In the example in FIG. 4, the sending device 100 is a smart speaker. The receiving device 200 is a mobile phone 406. The smart speaker is captured in each first frame and has a corresponding area in each first frame (e.g. area 404 in the one 402 of the first frames). The invisible light signal emitter 108 of the smart speaker is captured in each first frame and has a corresponding area in the corresponding area of the smart speaker (e.g. area 408 in the area 404) in each first frame. By using the first frames for pairing, an effect of "what you see is what you get" for a user is achieved. Compared to a related art that has a list of text-based identities (IDs) of the sending devices for the user to select one of the sending devices for pairing, using the first frames for pairing is more intuitive.

Figure 5:
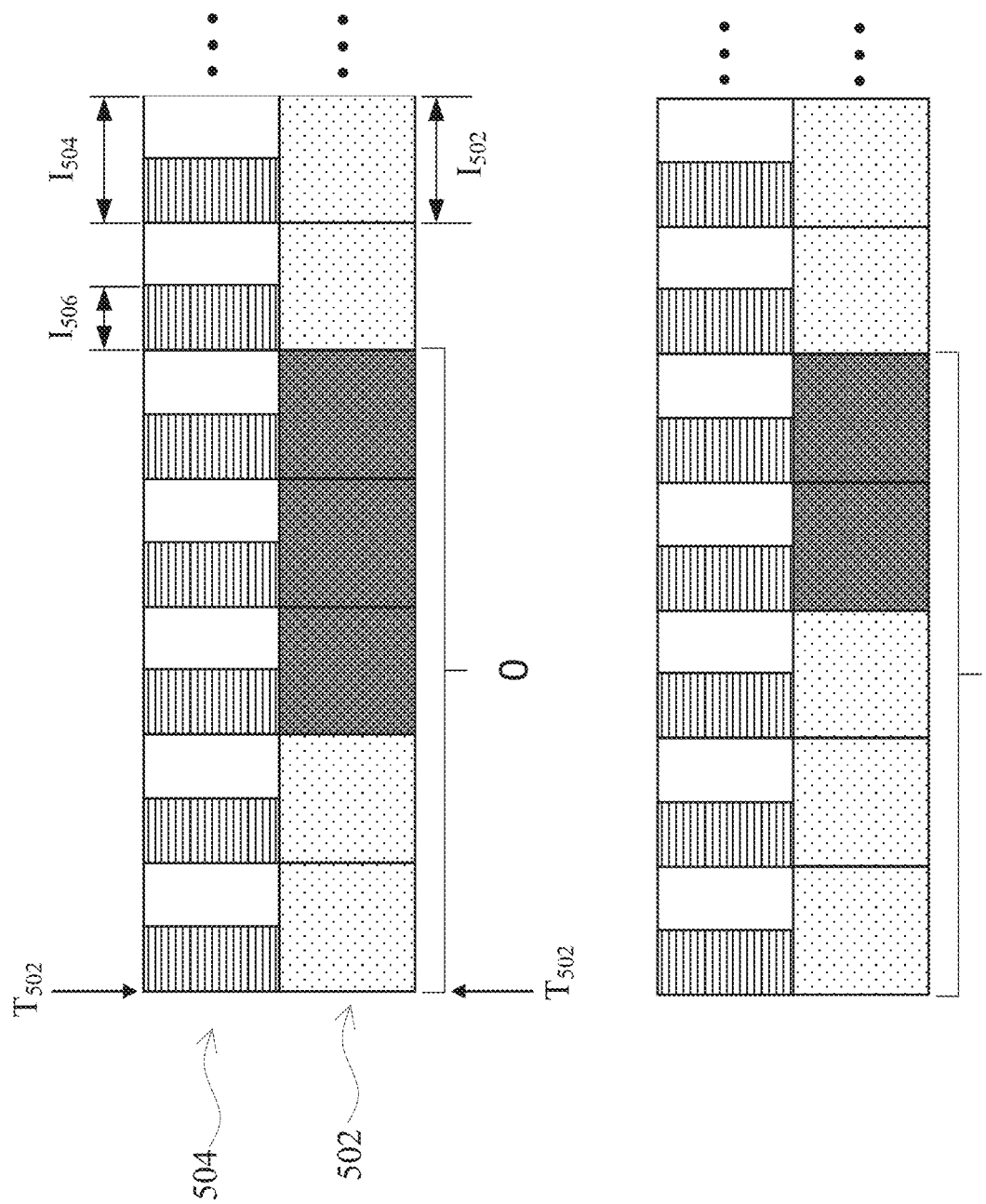
FIG. 5 is a timing diagram illustrating a signal pulse rate substantially same as a camera frame rate, and synchronized start timing for a first portion of first signal pulses and first frames that cause sampling to be successful in accordance with an embodiment of the present disclosure.

FIG. 5 is a timing diagram illustrating the signal pulse rate substantially same as the camera frame rate, and synchronized start timing for the first portion of the first signal pulses and the first frames that cause sampling to be successful in accordance with an embodiment of the present disclosure. In the example in FIG. 5, based on the signal pulse rate, the invisible light signal emitter 108 has a signal pulse interval $I_{502}$. Signal pulse intervals 502 correspond to the first portion of the first signal pulses. Based on the camera frame rate, the visible light camera module 202 has a sampling clock period $I_{504}$. Sampling clock periods 504 correspond to the first frames. A shutter of the visible light camera module 202 has an exposure time interval $I_{504}$ which is half of the sampling clock period $I_{502}$. The signal pulse interval $I_{502}$ is substantially same as the sampling clock period $I_{502}$. The signal pulse pattern is repeated in the first signal pulses. In the example in FIG. 5, there are 5 signal pulses for one of the first coding units. A signal pulse which is bright is indicated by less dense dots in a box for a signal pulse interval. A signal pulse which is dark is indicated by more dense dots in a box for a signal pulse interval. When there are 2 signal pulses which are bright in the 5 signal pulses, the bit of the data sequence corresponding to the 5 signal pulses is "0". When there are 3 signal pulses which are bright in the 5 signal pulses, the bit of the data sequence corresponding to the 5 signal pulses is "1". Suppose the first bit of the data sequence is "0". Each of the first frames are captured during the exposure time of a corresponding sampling clock period of the sampling clock periods 504. The invisible light signal emitter 108 and the visible light camera module 202 has the synchronized start timing for the first portion of the first signal pulses and the first frames. That is, both the signal pulse intervals 502 and the sampling clock periods 504 start at time $T_{502}$. The exposure time of each of the sampling clock periods 504 lies within the corresponding signal pulse interval of the signal pulse intervals 502.

Therefore, sampling is successful. The same applies to the case when the first bit of the data sequence is "1", as shown at the bottom of FIG. 5.

Figure 6:
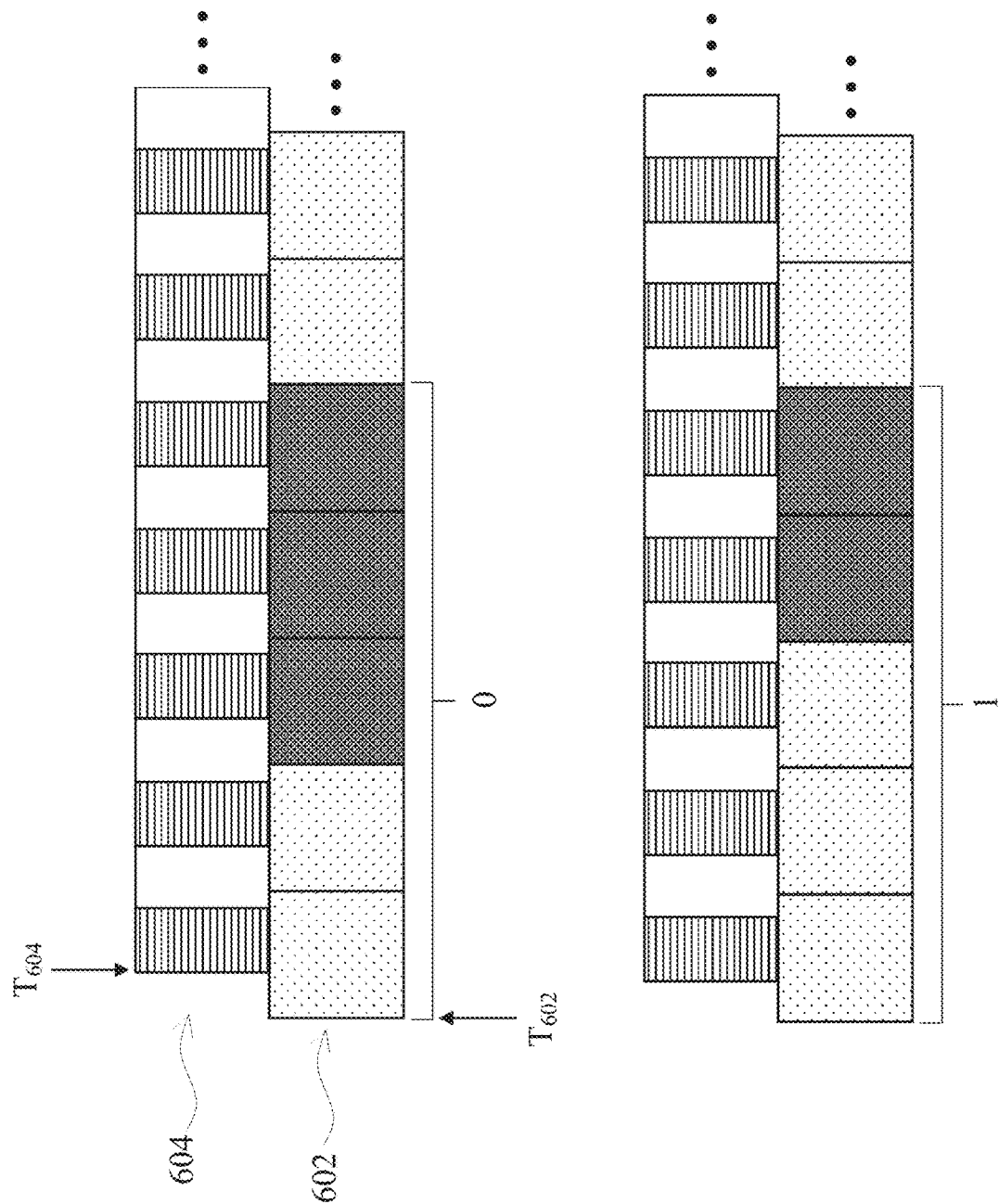
FIG. 6 is a timing diagram illustrating a signal pulse rate substantially same as a camera frame rate, and start timing for a first portion of first signal pulses and first frames in a first asynchronized manner that cause sampling to be successful in accordance with an embodiment of the present disclosure.

FIG. 6 is a timing diagram illustrating the signal pulse rate substantially same as the camera frame rate, and start timing for the first portion of the first signal pulses and the first frames in a first asynchronized manner that cause sampling to be successful in accordance with an embodiment of the present disclosure. Compared to the start timing for the first portion of the first signal pulses and the first frames in the example in FIG. 5, the start timing for the first portion of the first signal pulses and the first frames in the example in FIG. 6 is in the first asynchronized manner. That is, signal pulse intervals 602 starts at $T_{602}$ and sampling clock periods 604 starts at $T_{604}$ which is later than $T_{602}$ and within the first of the signal pulse intervals 602. The exposure time of each of the sampling clock periods 604 lies within the corresponding signal pulse interval of the signal pulse intervals 602. Therefore, sampling is successful. The same applies to the case when the first bit of the data sequence is "1", as shown at the bottom of FIG. 6.

Figure 7:
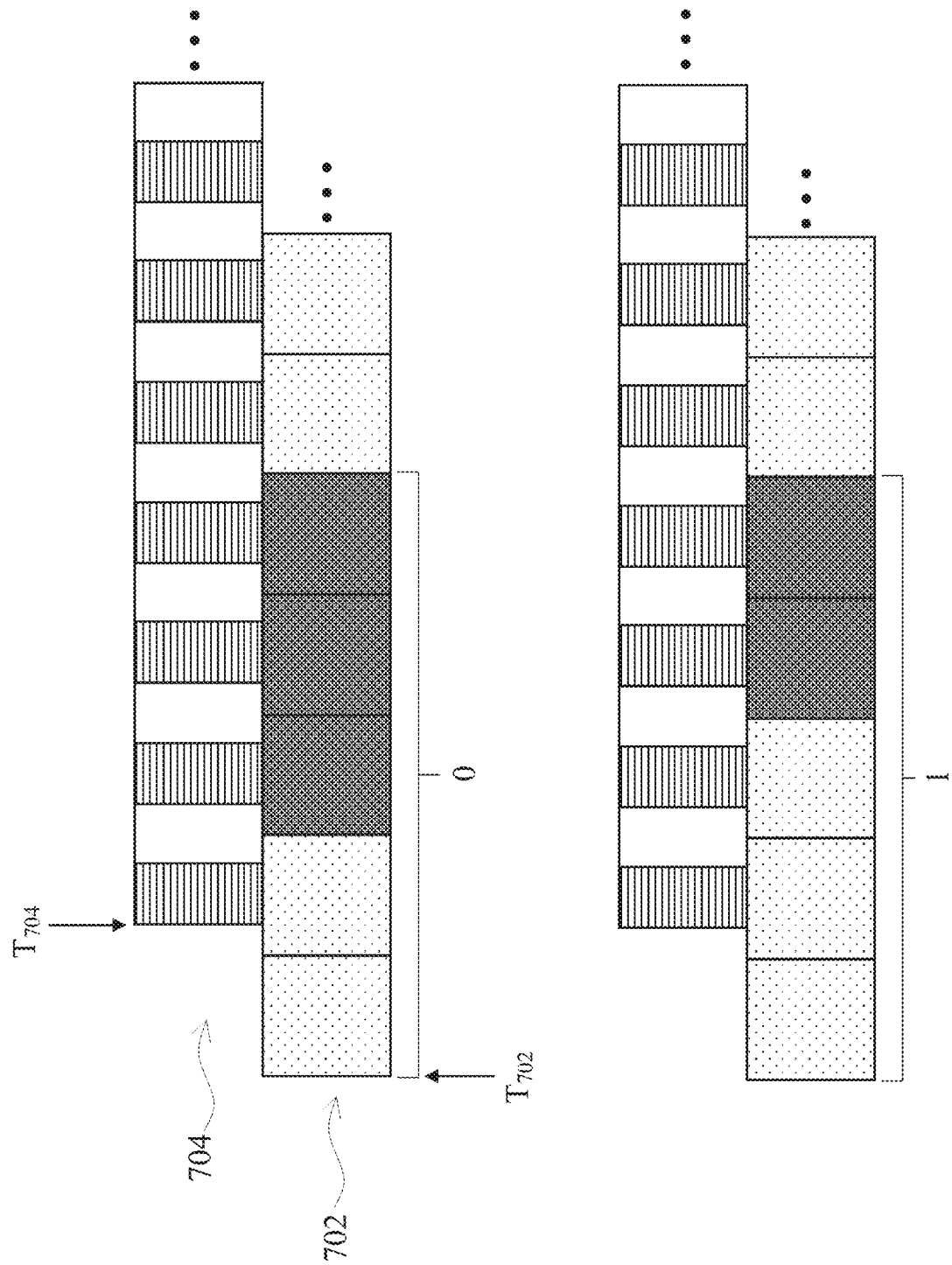
FIG. 7 is a timing diagram illustrating a signal pulse rate substantially same as a camera frame rate, and start timing for a first portion of first signal pulses and first frames in a second asynchronized manner that cause sampling to be successful in accordance with an embodiment of the present disclosure.

FIG. 7 is a timing diagram illustrating the signal pulse rate substantially same as the camera frame rate, and start timing for the first portion of the first signal pulses and the first frames in a second asynchronized manner that cause sampling to be successful in accordance with an embodiment of the present disclosure. Compared to the start timing for the first portion of the first signal pulses and the first frames in the example in FIG. 5, the start timing for the first portion of the first signal pulses and the first frames in the example in FIG. 7 is in the second asynchronized manner. That is, signal pulse intervals 702 starts at $T_{702}$ and sampling clock periods 704 starts at $T_{704}$ which is later than $T_{702}$ and within the second of the signal pulse intervals 702. The exposure time of each of the sampling clock periods 704 lies within the corresponding signal pulse interval of the signal pulse intervals 702. Because there are 2 signal pulses which are bright in the second to the sixth signal pulses in the first portion of the first signal pulses and the signal pulse pattern is repeated in the first portion of the first signal pulses, the second to the sixth signal pulses in the first portion of the first signal pulses may still represent the first bit of the data sequence which is "0". Therefore, sampling is successful. The same applies to the case when the first bit of the data sequence is "1", as shown at the bottom of FIG. 7.

Figure 8:
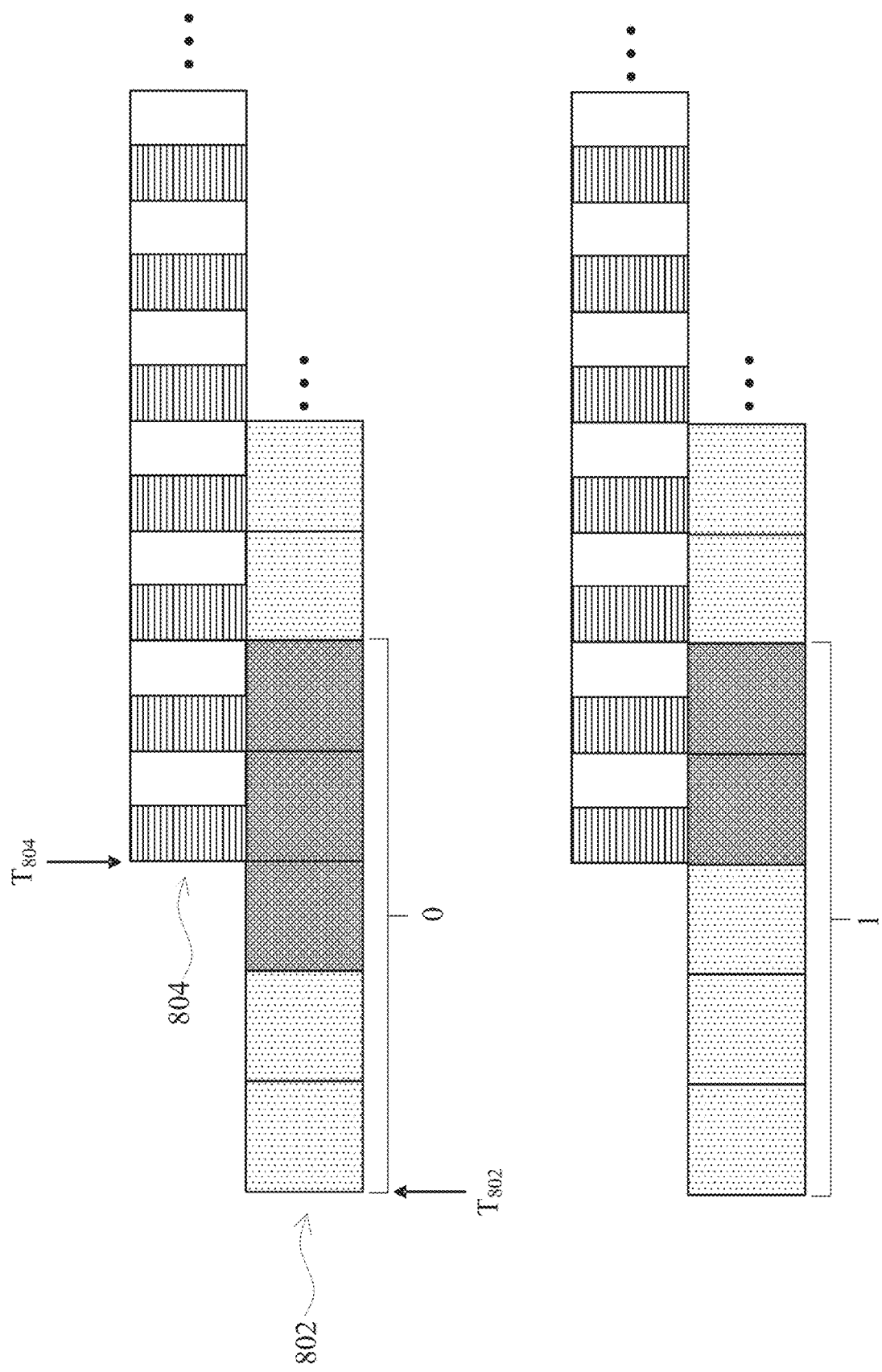
FIG. 8 is a timing diagram illustrating a signal pulse rate substantially same as a camera frame rate, and start timing for a first portion of first signal pulses and first frames in a third asynchronized manner that cause sampling to be successful in accordance with an embodiment of the present disclosure.

FIG. 8 is a timing diagram illustrating the signal pulse rate substantially same as the camera frame rate, and start timing for the first portion of the first signal pulses and the first frames in a third asynchronized manner that cause sampling to be successful in accordance with an embodiment of the present disclosure. Compared to the start timing for the first portion of the first signal pulses and the first frames in the example in FIG. 5, the start timing for the first portion of the first signal pulses and the first frames in the example in FIG. 8 is in the third asynchronized manner. That is, signal pulse intervals 802 starts at $T_{802}$ and sampling clock periods 804 starts at $T_{804}$ which is later than $T_{802}$ and within the fourth of the signal pulse intervals 802. The exposure time of each of the sampling clock periods 804 lies within the corresponding signal pulse interval of the signal pulse intervals 802. Because the fourth and the fifth of the first portion of the first signal pulses are dark, the fourth and the fifth of the first portion of the first signal pulses are discarded. The sixth to the tenth of the signal pulses in the first portion of the first signal pulses corresponds to the second bit of the data sequence which is obtained first. Because the signal pulse pattern is repeated in the first signal pulses, signal pulses corresponding to the first bit of the data sequence are obtained last. Therefore, sampling is successful. The same applies to the case when the first bit of the data sequence is "1", as shown at the bottom of FIG. 8.

Figure 9:
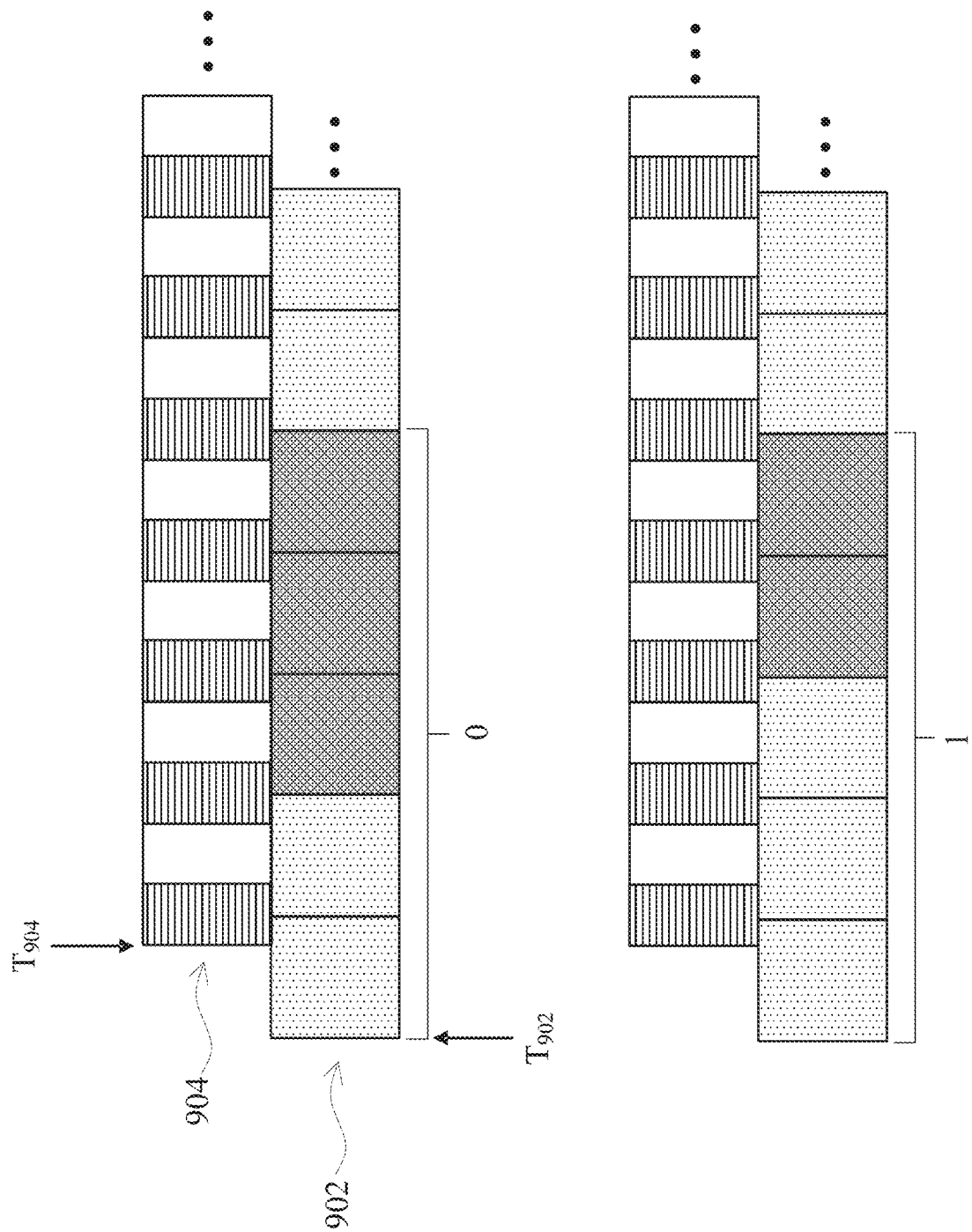
FIG. 9 is a timing diagram illustrating a signal pulse rate substantially same as a camera frame rate, and start timing for a first portion of first signal pulses and first frames in a fourth asynchronized manner that may cause sampling to be unsuccessful in accordance with an embodiment of the present disclosure.

FIG. 9 is a timing diagram illustrating the signal pulse rate substantially same as the camera frame rate, and start timing for the first portion of the first signal pulses and the first frames in a fourth asynchronized manner that may cause sampling to be unsuccessful in accordance with an embodiment of the present disclosure. Compared to the start timing for the first portion of the first signal pulses and the first frames in the example in FIG. 5, the start timing for the first portion of the first signal pulses and the first frames in the example in FIG. 9 is in the fourth asynchronized manner. That is, signal pulse intervals 902 starts at $T_{902}$ and sampling clock periods 904 starts at $T_{904}$ which is later than $T_{902}$ and within the first of the signal pulse intervals 902. However, the exposure time of one of the sampling clock periods 904 is across two signal pulse intervals of the signal pulse intervals 902 one of which corresponds to a bright signal pulse and the other of which corresponds to a dark signal pulse, such as the second and the third of the first portion of the first signal pulses, causing confusion as to whether a bright signal pulse or a dark signal pulse is sampled. Therefore, sampling is unsuccessful. The same applies to the case when the first bit of the data sequence is "1", as shown at the bottom of FIG. 9.

FIG. 10 is a flowchart illustrating an exposure time interval decreasing method 1000 for improving unsuccessful sampling in the situation in FIG. 9, and improving visibility of a portion of first areas in the first frames and corresponding to bright signal pulses of the first portion of the first signal pulses in accordance with an embodiment of the present disclosure. Referring to FIG. 10, the receiving method 350 further includes the exposure time interval decreasing method 1000 between the step 352 and the step 354. In step 1002, visibility of a second area which is over-exposed in a second frame captured with an exposure time interval of a shutter of the visible light camera module is obtained. In step 1004, the exposure time interval is decreased such that visibility of a third area in a third frame captured with the decreased exposure time interval is higher than the visibility of the second area.

Figure 11:
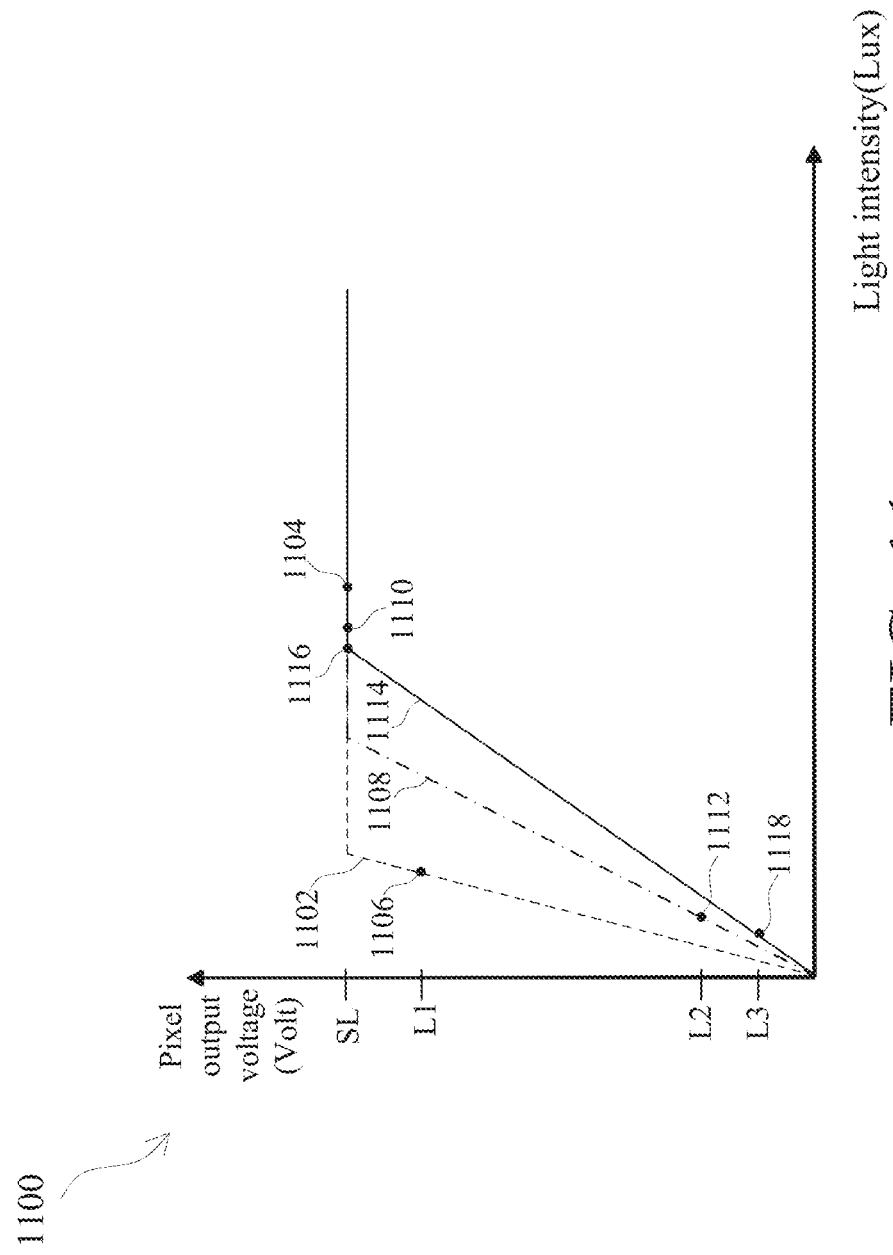
FIG. 11 is a diagram illustrating exemplary photo-electrical characteristic curves of the visible light camera for different exposure time intervals and the decreased exposure time interval improving the visibility of first areas in the first frames corresponding to the bright signal pulses of the first portion of the first signal pulses in accordance with an embodiment of the present disclosure.

In step 1002, visibility of a second area which is over-exposed in a second frame captured with an exposure time interval of a shutter of the visible light camera module is obtained. In step 1004, the exposure time interval is decreased such that visibility of a third area in a third frame captured with the decreased exposure time interval is higher than the visibility of the second area. FIG. 11 is a diagram 1100 illustrating exemplary photo-electrical characteristic curves 1102, 1108, and 1114 of the visible light camera 202 for different exposure time intervals E1, E2, and E3 and the decreased exposure time interval E2 or E3 improving the visibility of first areas in the first frames corresponding to the bright signal pulses of the first portion of the first signal pulses in accordance with an embodiment of the present disclosure. An X-axis of the diagram 1100 is a light intensity of light captured by a pixel of the visible light camera 202, and a Y-axis of the diagram 1100 is a pixel output voltage of the pixel of the visible light camera 202. In step 1002, the exposure time interval is, for example, the exposure time interval E1 equal to half of the sampling clock period 1502 (shown in FIG. 5). Because the invisible light signal emitter 108 emits invisible light, the second area may be caused by a bright signal pulse of the first signal pulses which is captured in the second frame. Under the exposure time interval E1, the pixel of the visible light camera 202 has the photo-electrical characteristic curve 1102. The photo-electrical characteristic curve 1102 has a first segment and a second segment. Compared to a pixel output voltage decreasing along the second segment of the photo-electrical characteristic curve 1102, a pixel output voltage decreasing along the first segment of the photo-electrical characteristic curve 1102 decreases slower as a light intensity decreases. In the example in FIG. 11, the first segment of the photo-electrical characteristic curve 1102 has a slope of 0 and the second segment of the photo-electrical characteristic curve 1102 has a slope larger than the slope of the first segment of the photo-electrical characteristic curve 1102. A point 1104 is located on the first segment of the photo-electrical characteristic curve 1102 and is not at the boundary between the first segment of the photo-electrical characteristic curve 1102 and the second segment of the photo-electrical characteristic curve 1102. The point 1104 indicates that a light intensity caused by the invisible light signal emitter 108 under the exposure time interval E1 causes a pixel output voltage of the pixel of the visible light camera 202 to be at a saturation level SL. Therefore, a pixel in the second area corresponding to the pixel of the visible light camera 202 is over-exposed. A point 1106 on the photo-electrical characteristic curve 1102 indicates that a light intensity caused by visible light under the exposure time interval E1 causes a pixel output voltage of the pixel of the visible light camera 202 to be at a level L1. The visible light is, for example, reflected from a first portion of the sending device 100.

In step 1004, the exposure time interval E1 is decreased until reaching an exposure time interval E2. The third area may be caused by a bright signal pulse of the first signal pulses which is captured in the third frame under the exposure time interval E2. Under the exposure time interval E2, the pixel of the visible light camera 202 has the photo-electrical characteristic curve 1108. The photo-electrical characteristic curve 1108 has a first segment and a second segment. Compared to a pixel output voltage decreasing along the second segment of the photo-electrical characteristic curve 1108, a pixel output voltage decreasing along the first segment of the photo-electrical characteristic curve 1108 decreases slower as a light intensity decreases. Further, compared to a pixel output voltage increasing along the second segment of the photo-electrical characteristic curve 1102, a pixel output voltage increasing along the second segment of the photo-electrical characteristic curve 1108 increases slower as a light intensity increases. In the example in FIG. 11, the first segment of the photo-electrical characteristic curve 1108 has a slope of 0 and the second segment of the photo-electrical characteristic curve 1108 has a slope larger than the slope of the first segment of the photo-electrical characteristic curve 1108 but smaller than the slope of the second segment of the photo-electrical characteristic curve 1102. A point 1110 is located on the first segment of the photo-electrical characteristic curve 1108 and is not at the boundary between the first segment of the photo-electrical characteristic curve 1108 and the second segment of the photo-electrical characteristic curve 1108. The point 1110 indicates that a light intensity caused by the invisible light signal emitter 108 under the exposure time interval E2 causes a pixel output voltage of the pixel of the visible light camera 202 to be at a saturation level SL. Therefore, a pixel in the third area corresponding to the pixel of the visible light camera 202 is over-exposed. A point 1112 on the photo-electrical characteristic curve 1108 indicates that a light intensity caused by visible light under the exposure time interval E2 causes a pixel output voltage of the pixel of the visible light camera 202 to be at a level L2. The visible light is, for example, reflected from the first portion of the sending device 100. Because the exposure time interval E2 is shorter than the exposure time interval E1, and the slope of the second segment of the photo-electrical characteristic curve 1108 is smaller than the slope of the second segment of the photo-electrical characteristic curve 1102, the level L2 is lower than the level L1. Because the level L2 is further away from the saturation level SL compared to the level L1, the visibility of the third area is higher than the visibility of the second area. By using the exposure time interval E2 for capturing the first frames, visibility of the portion of first areas in the first frames and corresponding to the bright signal pulses of the first portion of the first signal pulses is improved.

In step 1004, the exposure time interval E1 may be further decreased until reaching an exposure time interval E3. The third area may be caused by a bright signal pulse of the first signal pulses which is captured in the third frame under the exposure time interval E3. Under the exposure time interval E3, the pixel of the visible light camera 202 has the photo-electrical characteristic curve 1114. The photo-electrical characteristic curve 1114 has a first segment and a second segment. Compared to a pixel output voltage decreasing along the second segment of the photo-electrical characteristic curve 1114, a pixel output voltage decreasing along the first segment of the photo-electrical characteristic curve 1114 decreases slower as a light intensity decreases. Further, compared to a pixel output voltage increasing along the second segment of the photo-electrical characteristic curve 1108, a pixel output voltage increasing along the second segment of the photo-electrical characteristic curve 1114 increases slower as a light intensity increases. In the example in FIG. 11, the first segment of the photo-electrical characteristic curve 1114 has a slope of 0 and the second segment of the photo-electrical characteristic curve 1114 has a slope larger than the slope of the first segment of the photo-electrical characteristic curve 1114 but smaller than the slope of the second segment of the photo-electrical characteristic curve 1108. A point 1116 is located at the boundary between the first segment of the photo-electrical characteristic curve 1114 and the second segment of the photo-electrical characteristic curve 1114. The point 1116 indicates that a light intensity caused by the invisible light signal emitter 108 under the exposure time interval E3 causes a pixel output voltage of the pixel of the visible light camera 202 to be at a saturation level SL. A point 1118 on the photo-electrical characteristic curve 1114 indicates that a light intensity caused by visible light under the exposure time interval E3 causes a pixel output voltage of the pixel of the visible light camera 202 to be at a level L3. The visible light is, for example, reflected from the first portion of the sending device 100. Because the exposure time interval E3 is shorter than the exposure time interval E2, and the slope of the second segment of the photo-electrical characteristic curve 1114 is smaller than the slope of the second segment of the photo-electrical characteristic curve 1108, the level L3 is lower than the level L2. Because the level L3 is further away from the saturation level SL compared to the level L2, the visibility of the third area under the exposure time interval E3 is higher than the visibility of the third area under the exposure time interval E2. Further, because the point 1116 is located at the boundary between the first segment of the photo-electrical characteristic curve 1114 and the second segment of the photo-electrical characteristic curve 1114, further decreasing the exposure time interval E3 would cause a pixel output voltage of the pixel of the visible light camera 202 to be at a level lower than the saturation level, causing a visibility of the third area captured under such exposure time interval to be lower than the visibility of the third area captured under the exposure time interval E3. Hence, the visibility of the third area captured under the exposure time interval E3 is the highest. A pixel in the third area captured under the exposure time interval E3 is properly exposed. By using the exposure time interval E3 for capturing the first frames, visibility of the portion of first areas in the first frames and corresponding to the bright signal pulses of the first portion of the first signal pulses is the highest.

In the example in FIG. 11, the first segments and the second segments of the photo-electrical characteristic curves 1102, 1108, and 1114 are straight lines. Other forms of the photo-electrical characteristic curves such as a photo-electrical characteristic curve including a logarithmic segment are within the contemplated scope of the present disclosure.

Figure 12:
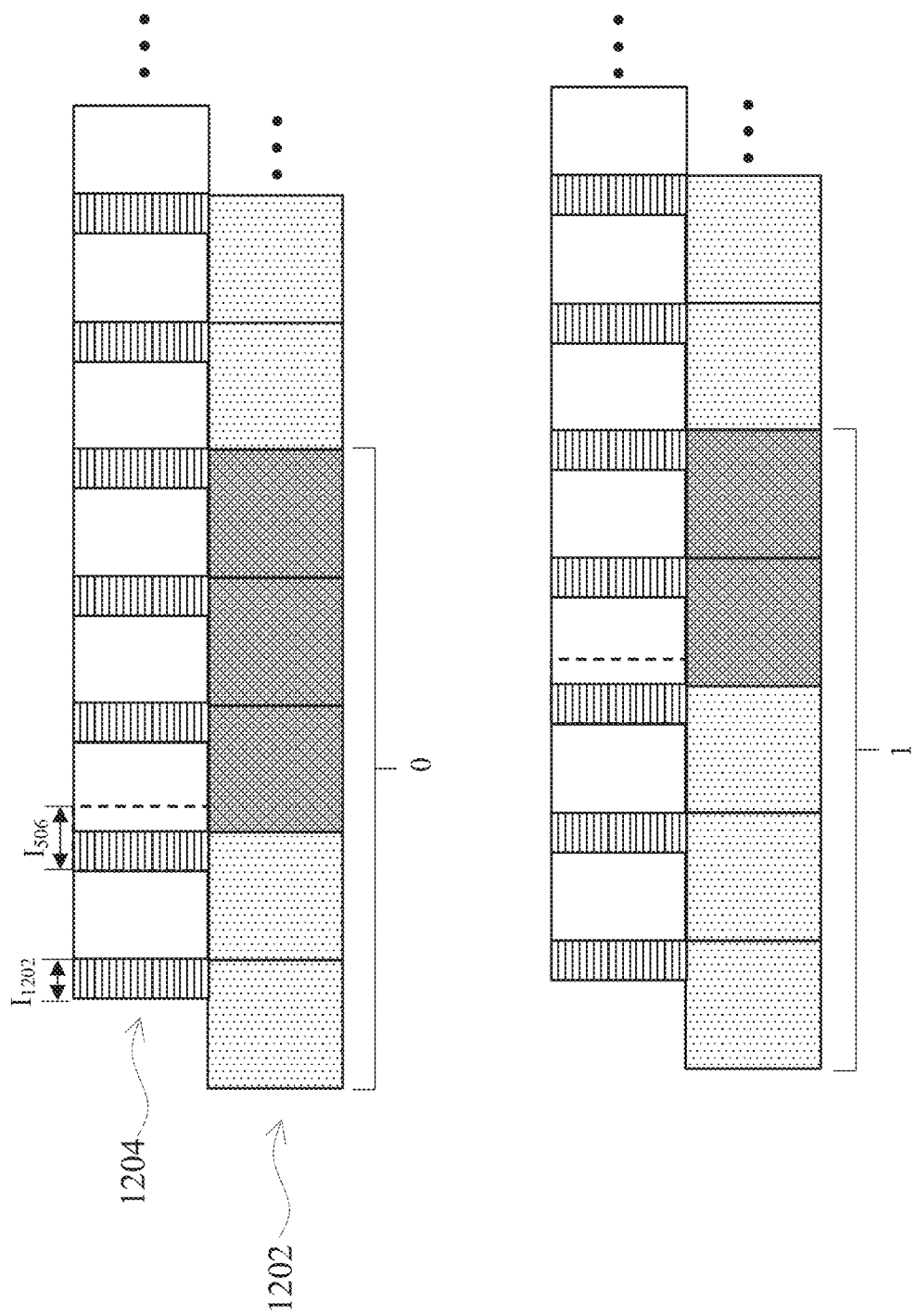
FIG. 12 is a timing diagram illustrating a decreased exposure time interval for improving unsuccessful sampling in the situation in FIG. 9 in accordance with an embodiment of the present disclosure.

FIG. 12 is a timing diagram illustrating the decreased exposure time interval for improving unsuccessful sampling in the situation in FIG. 9 in accordance with an embodiment of the present disclosure. Compared to the exposure time interval $I_{506}$ (shown in FIG. 5) in the example in FIG. 9, the exposure time interval $I_{1202}$ in the example in FIG. 12 is the decreased exposure time interval in FIG. 10. Because the exposure time interval $I_{1202}$ is shorter than the exposure time interval 1506, there is a smaller chance that exposure time of one of sampling clock periods 1204 is across two signal pulse intervals of signal pulse intervals 1202 one of which corresponds to a bright signal pulse and the other of which corresponds to a dark signal pulse. For example, exposure time with the exposure time interval $I_{506}$ is across the second and the third of the first portion of the first signal pulses. Exposure time with the exposure time interval $I_{1202}$ is within the second of the first portion of the first signal pulses, avoiding confusion as to whether the second or the third of the first portion of the first signal pulses is sampled. The shortest exposure time E3 described with reference to FIG. 11 has the smallest chance that the exposure time of the one of the sampling clock periods 1204 is across the two signal pulse intervals of the signal pulse intervals 1202 one of which corresponds to a bright signal pulse and the other of which corresponds to a dark signal pulse.

FIG. 13 is a flowchart illustrating a color conversion method 1300 for the portion of the first areas to be more differentiable from other areas in the first frames that would have a color similar to the portion of the first areas if the color conversion method 1300 was not performed in accordance with an embodiment of the present disclosure. Referring to FIG. 13, the receiving method 350 further includes the color conversion method 1300 between the step 352 and the step 354. In step 1302, a white balance of the visible light camera module is adjusted such that a color of the invisible light emitted by the first invisible light signal emitter is more differentiable from a color of visible light similar to the color of the invisible light emitted by the first invisible light signal emitter at a neutral white balance.

Figure 14:
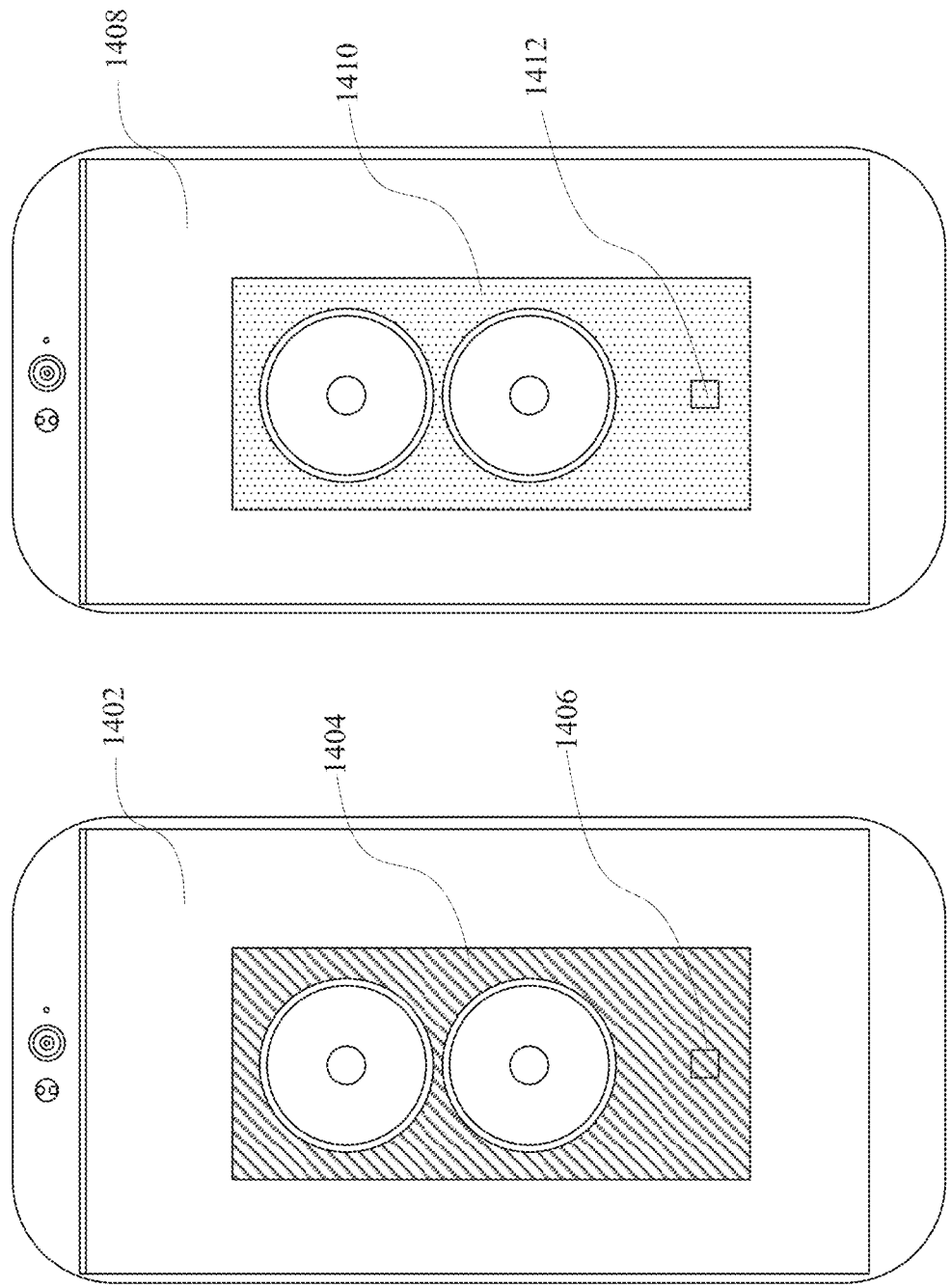
FIG. 14 is a diagram illustrating an exemplary color converting scenario in accordance with an embodiment of the present disclosure.

In step 1302, a white balance of the visible light camera module is adjusted such that a color of the invisible light emitted by the first invisible light signal emitter is more differentiable from a color of visible light similar to the color of the invisible light emitted by the first invisible light signal emitter at a neutral white balance. FIG. 14 is a diagram illustrating an exemplary color converting scenario in accordance with an embodiment of the present disclosure. In the example in FIG. 14, if the visible light camera module 202 (shown in FIG. 2) captures, at a neutral white balance, a frame 1402 including an area 1404 corresponding to a cover of the smart speaker surrounding the invisible light signal emitter 108, and an area 1406 corresponding to the invisible light signal emitter 108, the area 1404 has a higher chance to have a color similar to the area 1406 as shown by a same fill pattern for the area 1404 and the area 1406. The reason is that most of indoor lighting causes visible light reflected from an indoor environment and captured in a frame under the neutral white balance to be mostly warm. When a color of the cover of the smart speaker is, for example, white, the indoor lighting causes visible light reflected from the cover of the smart speaker and captured in the frame 1402 under the neutral white balance to be warm. In the embodiment that the invisible light signal emitter 108 emits infrared, a color of the infrared captured in the frame 1402 is also warm. In step 1302, the white balance of the visible light camera module 202 is adjusted to a color temperature such that a frame captured by the visible light camera module 202 at the adjusted white balance is blue-focused. In an embodiment, the white balance is adjusted to a color temperature less than 3000K. In this way, red light causes a gray color in the frame, and infrared causes a gray purple color in the frame. When the visible light camera module 202 captures, at the adjusted neutral white balance, a frame 1408 including an area 1410 corresponding to the cover of the smart speaker surrounding the invisible light signal emitter 108, and an area 1412 corresponding to the invisible light signal emitter 108, the area 1410 has a smaller chance to have a color similar to the area 1412 as shown by the area 1410 being filled by a fill pattern while the area 1412 is not filled by a fill pattern. By using the adjusted white balance for capturing the first frames, the portion of the first areas is more differentiable from other areas in the first frames that would have a color similar to the portion of the first areas if the color conversion method 1300 was not performed.

In the example in FIG. 14, the invisible light signal emitter 108 emits infrared. Alternatively, an invisible light signal emitter emits ultraviolet. The visible light camera module 202 captures ultraviolet. A white balance of the visible light camera module 202 is adjusted to a color temperature such that a frame captured by the visible light camera module 202 at the adjusted white balance is red-focused.

FIG. 15 is a flowchart illustrating a method 1500 for autofocusing on the first invisible light signal emitter when the first invisible light signal emitter emits the first portion of the first signal pulses in accordance with an embodiment of the present disclosure. Referring to FIG. 15, the receiving method 350 further includes the method 1500 between the step 352 and the step 354. In step 1502, a plurality of fourth frames are captured at the camera frame rate, wherein each fourth frame includes a corresponding fourth area caused by a corresponding signal pulse of a second portion of the first signal pulses, and a corresponding fifth area corresponding to a portion of the sending device not including the first invisible light signal emitter. After the step 1502, the step 1002 is proceeded. Also, in step 1504, the corresponding fourth area in each fourth frame is caused to be aligned with each other by aligning the corresponding fifth area in each fourth frame with each other. In step 1506, the corresponding fourth area is detected in each fourth frame, to determine a position of the corresponding fourth area. In step 1508, the first invisible light signal emitter is autofocused on when the first invisible light signal emitter emits the first portion of the first signal pulses by identifying the first invisible light signal emitter as a subject for subject tracking using the position of each of at least one fourth area of the fourth areas.

Figure 16:
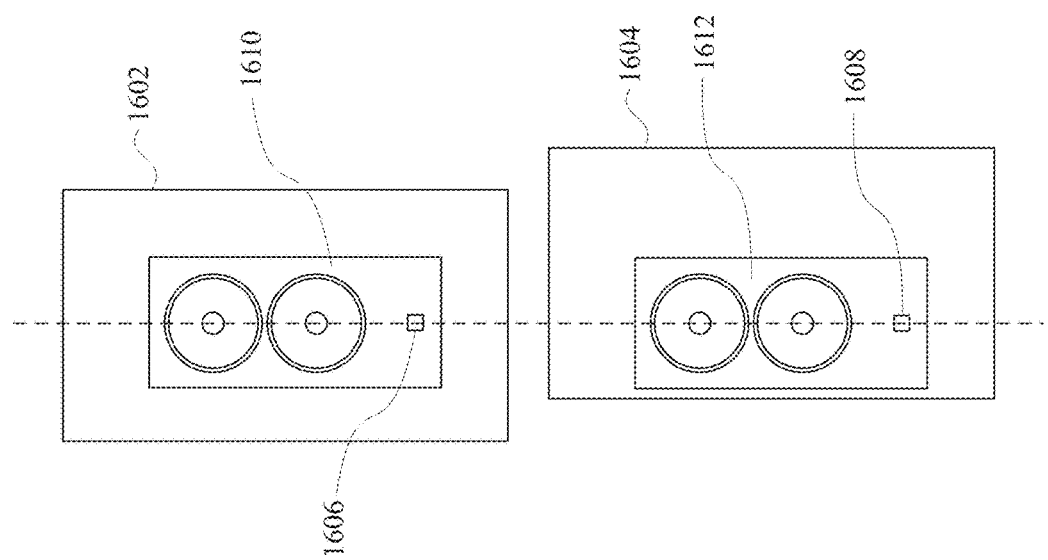
FIG. 16 is a diagram illustrating capturing, aligning, and detecting steps in the method for autofocusing in FIG. 15 in accordance with an embodiment of the present disclosure.

FIG. 16 is a diagram illustrating the capturing, aligning, and detecting steps 1502, 1504, and 1506 in the method 1500 for autofocusing in FIG. 15 in accordance with an embodiment of the present disclosure. Referring to FIG. 16, in step 1502, a plurality of fourth frames (e.g. 1602 and 1604) are captured at the camera frame rate, wherein each fourth frame 1602 or 1604 includes a corresponding fourth area 1606 or 1608 caused by a corresponding signal pulse of a second portion of the first signal pulses, and a corresponding fifth area 1610 or 1612 corresponding to a portion of the sending device 100 (shown in FIG. 1) not including the first invisible light signal emitter 108. In step 1504, the corresponding fourth area 1606 or 1608 in each fourth frame 1602 or 1604 is caused to be aligned (as shown by a dotted line through the fourth areas 1606 and 1608) with each other 1608 or 1606 by aligning the corresponding fifth area 1610 or 1612 in each fourth frame 1602 or 1604 with each other 1612 or 1610. In an embodiment, texture of the fifth area 1610 or 1612 may be used for alignment. After step 1504, the fourth areas 1606 and 1608 are aligned both in an up-down direction and a left-right direction. For simplicity, the alignment in the up-down direction is not shown. In step 1506, the corresponding fourth area 1606 or 1608 is detected in each fourth frame 1602 or 1604, to obtain a position of the corresponding fourth area 1606 or 1608. The fourth areas 1606 and 1608 may be detected based on a property that areas at aligned positions blink. A position of the last 1608 of the fourth areas 1606 and 1608 may be used for autofocusing. Alternatively, all positions of the fourth areas 1606 and 1608 are used for autofocusing.

In the example in FIG. 16, there are two fourth areas 1606 and 1608. Other number of the fourth areas are within the contemplated scope of the present disclosure.

FIG. 17 is a diagram illustrating the autofocusing step 1508 in the method 1500 for autofocusing in FIG. 15 in accordance with an embodiment of the present disclosure. Referring to FIG. 17, in step 1508, the invisible light signal emitter 108 is autofocused on when the invisible light signal emitter 108 emits the first portion of the first signal pulses by identifying the invisible light signal emitter 108 as a subject for subject tracking using the position of each of at least one fourth area of the fourth areas 1606 and 1608 (shown in FIG. 16). The first frames 1702 capture the first portion of the first signal pulses when the invisible light signal emitter 108 emits the first portion of the first signal pulses. By identifying the invisible light signal emitter 108 as the subject for subject tracking, the invisible light signal emitter 108 stays being autofocused on even if a user holding the receiving device 200 (shown in FIG. 2) moves his or her hand when the first frames 1702 are captured. This is indicated by first areas 1704 . . . 1706 in the first frames 1702 and corresponding to the first portion of the first signal pulses are all boxed by dotted lines even if the first areas 1704 . . . 1706 are not at a same position in the corresponding frames of the first frames 1702.

FIG. 18 is a flowchart illustrating a method 1800 for autofocusing when multiple sending devices present in accordance with an embodiment of the present disclosure. The method 1800 enhances the method 1500 for a situation when the multiple sending devices present. Referring to FIG. 18, the receiving method 350 further includes the method 1800 between step 352 and step 354. In step 1802, a plurality of fourth frames are captured at the camera frame rate, wherein each fourth frame includes a corresponding fourth area caused by a corresponding signal pulse of a second portion of the first signal pulses, at least one corresponding fifth area each of which is caused by a corresponding signal pulse of second signal pulses emitted by a second invisible light signal emitter of a corresponding other sending device of at least one other sending device, and a corresponding sixth area corresponding to a portion of the sending device not including the first invisible light signal emitter or a portion of any of the at least one other sending device not including the second invisible light signal emitter. In step 1804, the corresponding fourth area in each fourth frame is caused to be aligned with each other by aligning the corresponding sixth area in each fourth frame with each other. In step 1806, the corresponding fourth area and the at least one corresponding fifth area are detected in each fourth frame, to obtain a position of the corresponding fourth area and a position of each of the at least one corresponding fifth area. In step 1808, a number of the fourth area and the at least one fifth area in the one of the fourth frames are counted, to obtain a number of the sending device and the at least one other sending device. In step 1810, for each of the sending device and the at least one other sending device, area sizes of a plurality of corresponding areas in the fourth frames are averaged. In step 1812, the position of each of at least one fourth area of the fourth areas is selected to be used for autofocusing based on an area size of the fourth area in one of the fourth frames being the biggest among the fourth area and the at least one fifth area in the one of the fourth frames. In step 1804, whether a user touches to change a selection is determined. If so, step 1816 is proceeded. If not, step 1508 is proceeded. In step 1816, autofocusing is performed based on the changed selection.

Figure 19:
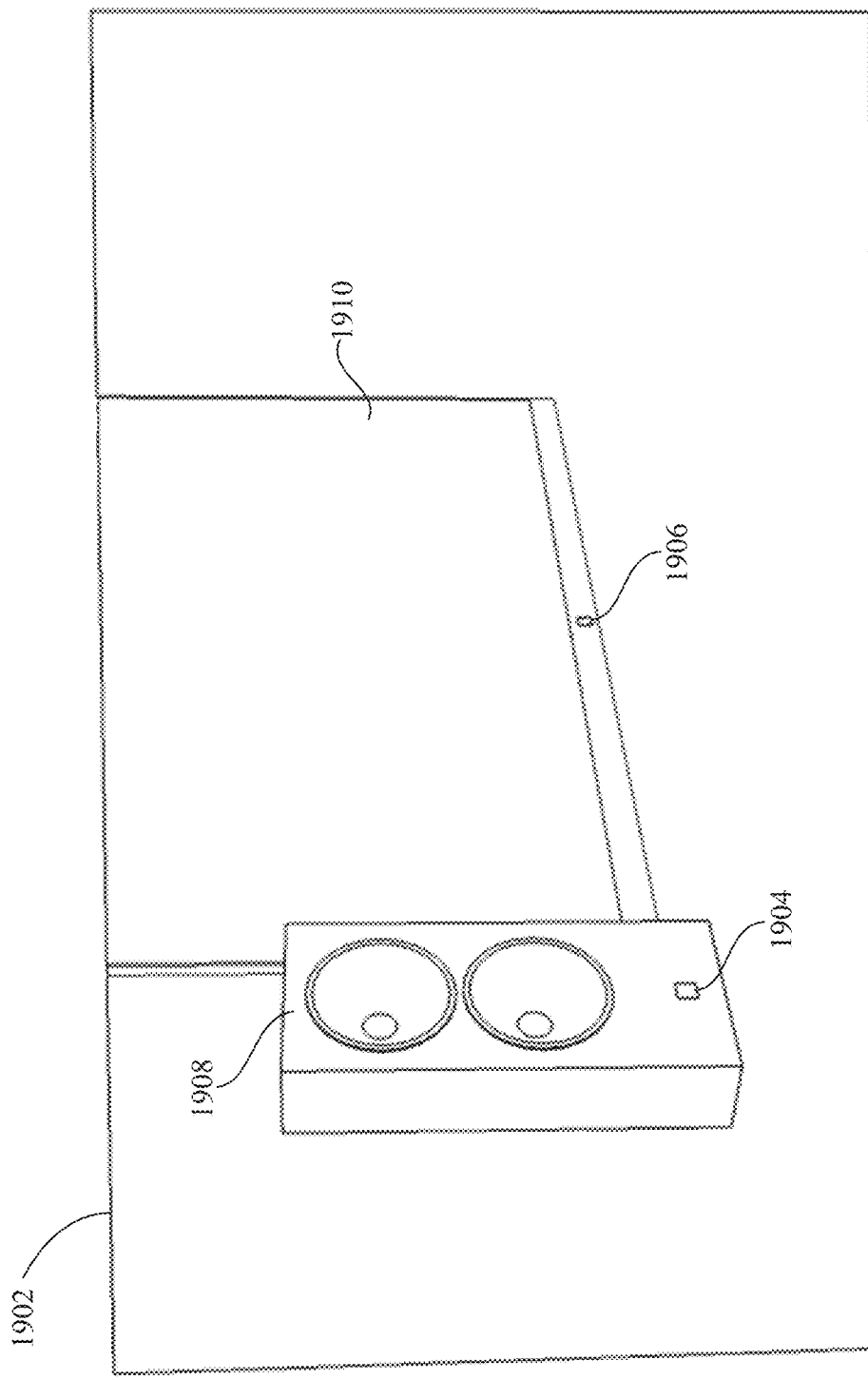
FIG. 19 is a diagram illustrating an exemplary multiple sending device scenario to which the method for autofocusing in FIG. 18 may be applied in accordance with an embodiment of the present disclosure.

FIG. 19 is a diagram illustrating an exemplary multiple sending device scenario to which the method 1800 for autofocusing in FIG. 18 may be applied in accordance with an embodiment of the present disclosure. The steps 1802, 1804, and 1806 are similar to the steps 1502, 1504, and 1506 which are illustrated in FIG. 16, and therefore only one fourth frame is illustrated in FIG. 19 for simplicity. Referring to FIG. 19, in step 1802, a plurality of fourth frames (one 1902 of which is exemplarily shown) are captured at the camera frame rate, wherein each fourth frame 1902 includes a corresponding fourth area 1904 caused by a corresponding signal pulse of a second portion of the first signal pulses, at least one corresponding fifth area (one 1906 of which is exemplarily shown) each of which is caused by a corresponding signal pulse of second signal pulses emitted by a second invisible light signal emitter of a corresponding other sending device of at least one other sending device, and a corresponding sixth area 1908 or 1910 corresponding to a portion of the sending device 100 (shown in FIG. 1) not including the invisible light signal emitter 108 or a portion of any of the at least one other sending device not including the second invisible light signal emitter. The at least one corresponding fifth area corresponds to the at least one other sending device. The second signal pulses correspond to the fourth frames 1902. In the example in FIG. 19, the sending device 100 is a smart speaker. The at least one other sending device is a smart TV. In step 1804, the corresponding fourth area 1904 in each fourth frame 1902 is caused to be aligned with each other by aligning the corresponding sixth area 1908 or 1910 in each fourth frame 1902 with each other. In step 1806, the corresponding fourth area 1904 and the at least one corresponding fifth area 1906 are detected in each fourth frame 1902, to obtain a position of the corresponding fourth area 1904 and a position of each of the at least one corresponding fifth area 1906. In step 1808, a number of the fourth area 1904 and the at least one fifth area 1906 in the one of the fourth frames 1902 are counted, to obtain a number of the sending device 100 and the at least one other sending device. In the example in FIG. 19, the number of fourth area 1904 and the at least one fifth area 1906 is two, which indicates the number of the sending device 100 and the at least one other sending device is two. In step 1810, for each of the sending device 100 and the at least one other sending device based on the number of the sending device 100 and the at least one other sending device, area sizes of a plurality of corresponding areas in the fourth frames 1902 are averaged. Each of the corresponding areas is one of the fourth area 1904 and the at least one fifth area 1906 in a corresponding frame of the fourth frames 1902. The one of the fourth area 1904 and the at least one fifth area 1906 is caused by a bright signal pulse of the first signal pulses, or a bright signal pulse of the second signal pulses corresponding to one of the at least one fifth area 1906. In step 1812, the position of each of at least one fourth area of the fourth areas 1904 is selected to be used for autofocusing based on an area size of the fourth area 1904 in one of the fourth frames 1902 being the biggest among the fourth area 1904 and the at least one fifth area 1906 in the one of the fourth frames 1902. In step 1804, whether a user touches to change a selection is determined. The user may touch to select the smart TV. If so, step 1816 is proceeded. If not, step 1508 is proceeded. In step 1816, autofocusing is performed based on the changed selection.

Figure 20:
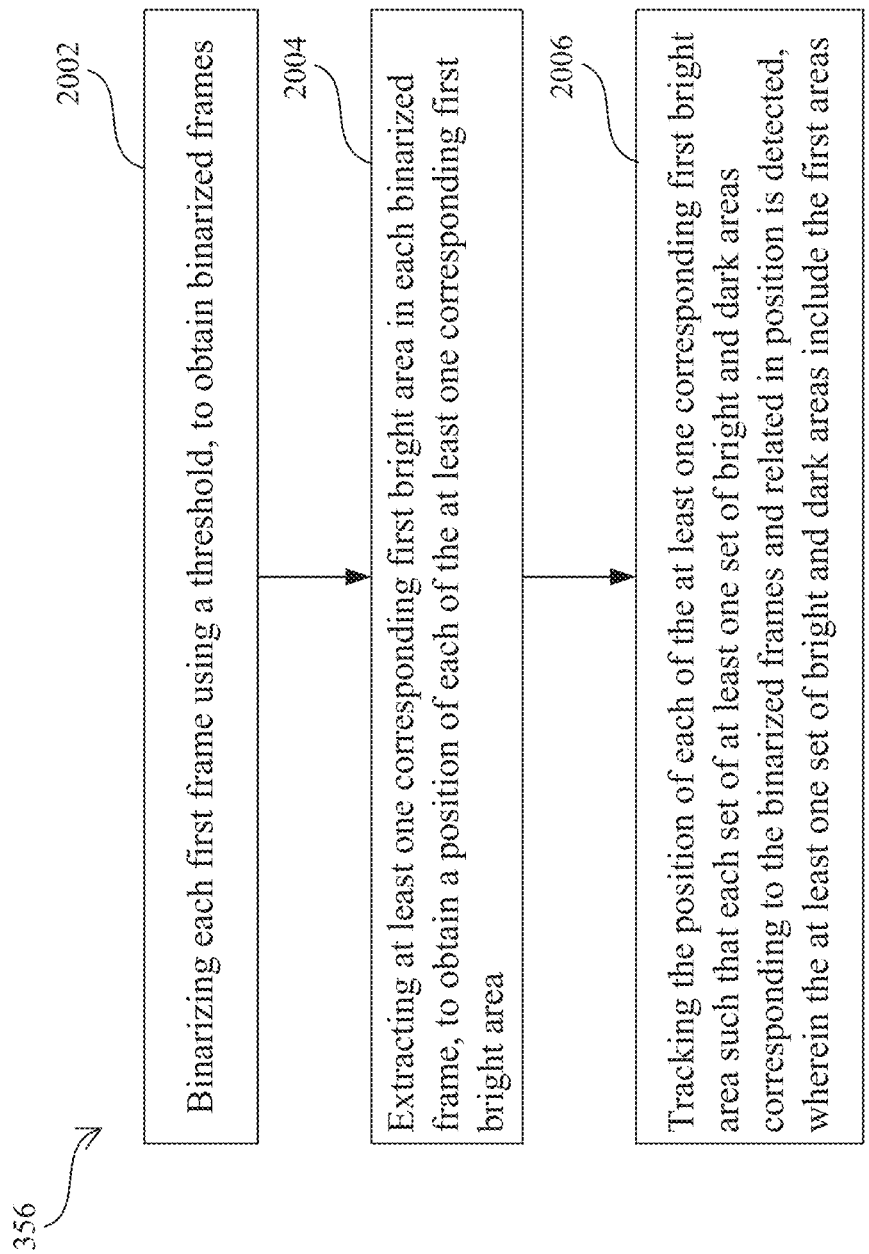
FIG. 20 is a flowchart illustrating a detecting step in a method for analyzing the first frames to obtain a data sequence in accordance with an embodiment of the present disclosure.

Referring to FIG. 3, the receiving method 350 includes a method for analyzing the first frames to obtain the data sequence, which includes step 356 and step 358. In step 356, the corresponding first area in each first frame is detected. In step 358, the corresponding first area in each first frame is labeled, to obtain a first coding pattern corresponding to the signal pulse pattern, and the first coding pattern is decoded, to identify the data sequence. FIG. 20 is a flowchart illustrating the detecting step 356 in the method for analyzing the first frames to obtain the data sequence in accordance with an embodiment of the present disclosure. The step 356 includes the following steps. Referring to FIG. 20, in step 2002, each first frame is binarized using a threshold, to obtain binarized frames. In step 2004, at least one corresponding first bright area is extracted in each binarized frame, to obtain a position of each of the at least one corresponding first bright area. In step 2006, the position of each of the at least one corresponding first bright area is tracked such that each set of at least one set of bright and dark areas corresponding to the binarized frames and related in position is detected, wherein the at least one set of bright and dark areas include the first areas.

Figure 21:
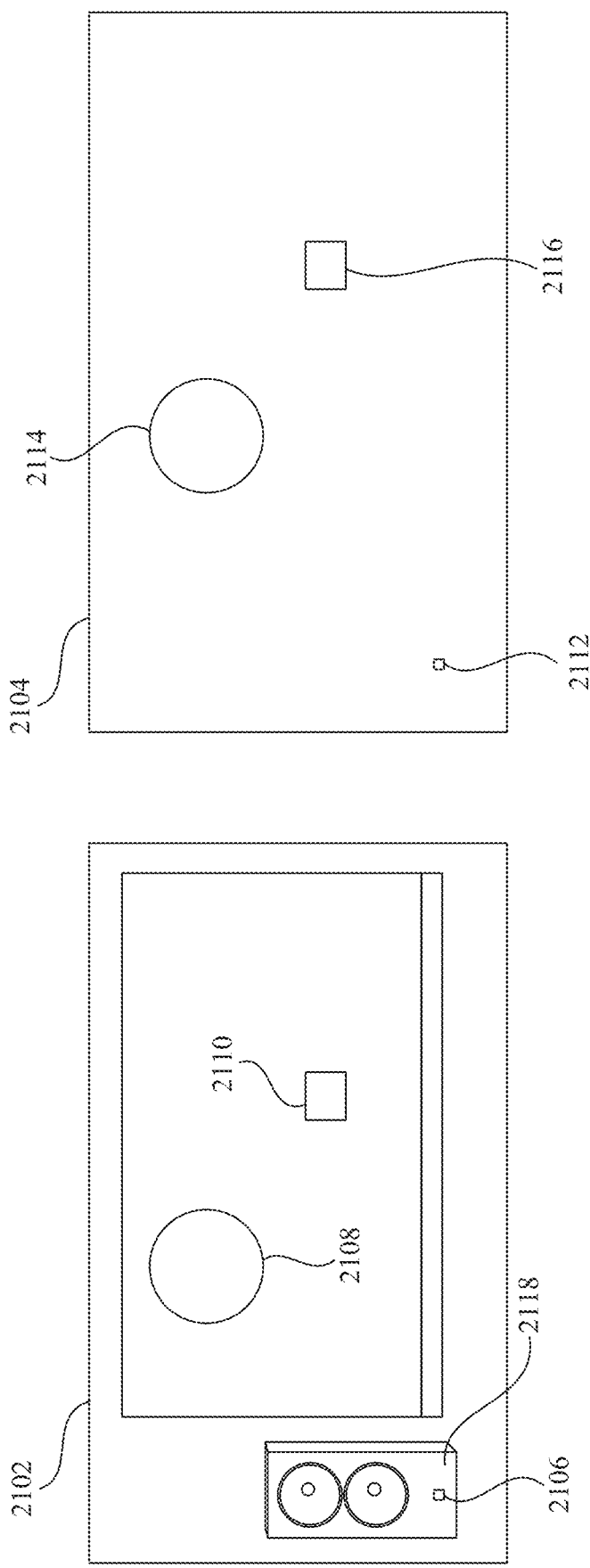
FIG. 21 is a diagram illustrating, in the detecting step, a binarizing step that eliminates areas which are not the first areas based on brightness or color in accordance with an embodiment of the present disclosure.

FIG. 21 is a diagram illustrating, in the detecting step 356, the binarizing step 2002 that eliminates areas which are not the first areas based on brightness or color in accordance with an embodiment of the present disclosure. In step 2002, each first frame 2102 is binarized using a threshold, to obtain binarized frames (one 2104 of which corresponding to the first frame 2102 is exemplarily shown). In an embodiment, the threshold is within a vicinity of at least one pixel value of one pixel of one of the first areas (one 2106 of which is exemplarily shown). The one of the first areas 2106 corresponds to a bright signal pulse of the first signal pulses. The at least one pixel value is a brightness value (e.g. luma or luminance). In the example in FIG. 21, because the one of the first areas 2106 corresponds to the bright signal pulse of the first signal pulses of the invisible signal emitter 108, and areas 2108 and 2110 correspond to a circular area and a square area displayed by a smart TV, the one of the first areas 2106 and the areas 2108 and 2110 have higher bright values compared to the other portion in the first frame 2102. Further, because the threshold is set within the vicinity of the brightness value of one pixel of the one of the first areas 2106, areas 2112, 2114, and 2116 corresponding to the one of the first areas 2106, and the areas 2108 and 2110 are bright areas in the binarized frame 2104. The areas 2112, 2114, and 2116 are candidates for the one of the first areas 2106 to be used to identify the data sequence. The other portion in the first frame 2102 are eliminated to be candidates in the binarized frame 2104.

Alternatively, when the color conversion method 1300 has been performed, the threshold is within a vicinity of a set of pixel values of one pixel of one of the first areas 2106. The one of the first areas 2106 corresponds to a bright signal pulse of the first signal pulses. The set of pixel values include a color value. In an embodiment, the set of pixel values is RGB color values. The smart speaker in the example in FIG. 21 is similar to the smart speaker in the example in FIG. 14. If the color conversion method 1300 was not performed, a color of an area 2118 corresponding to the cover of the smart speaker surrounding the invisible light signal emitter 108 would be less differentiable from a color of one of the first areas 2106 corresponding to the invisible light signal emitter 108. By performing the color conversion method 1300 and using the threshold within the vicinity the RGB color values of one pixel of one of the first areas, an area 2112 corresponding to the one of the first areas 2106 is a bright area in the binarized frame 2104, whereas an area (not labeled) corresponding to the area 2118 is a dark area in the binarized frame 2104. Further, areas 2108 and 2110 corresponding to a circular area and a square area displayed by a smart TV have colors similar to the one of the first areas 2106 after the color conversion method 1300 is performed. Therefore, areas 2114 and 2116 corresponding to the areas 2108 and 2110 are also bright areas in the binarized frame 2104. The areas 2112, 2114, and 2116 are candidates for the one of the first areas 2106 to be used to identify the data sequence. The other portion in the first frame 2102 are eliminated to be candidates in the binarized frame 2104.

Figure 22:
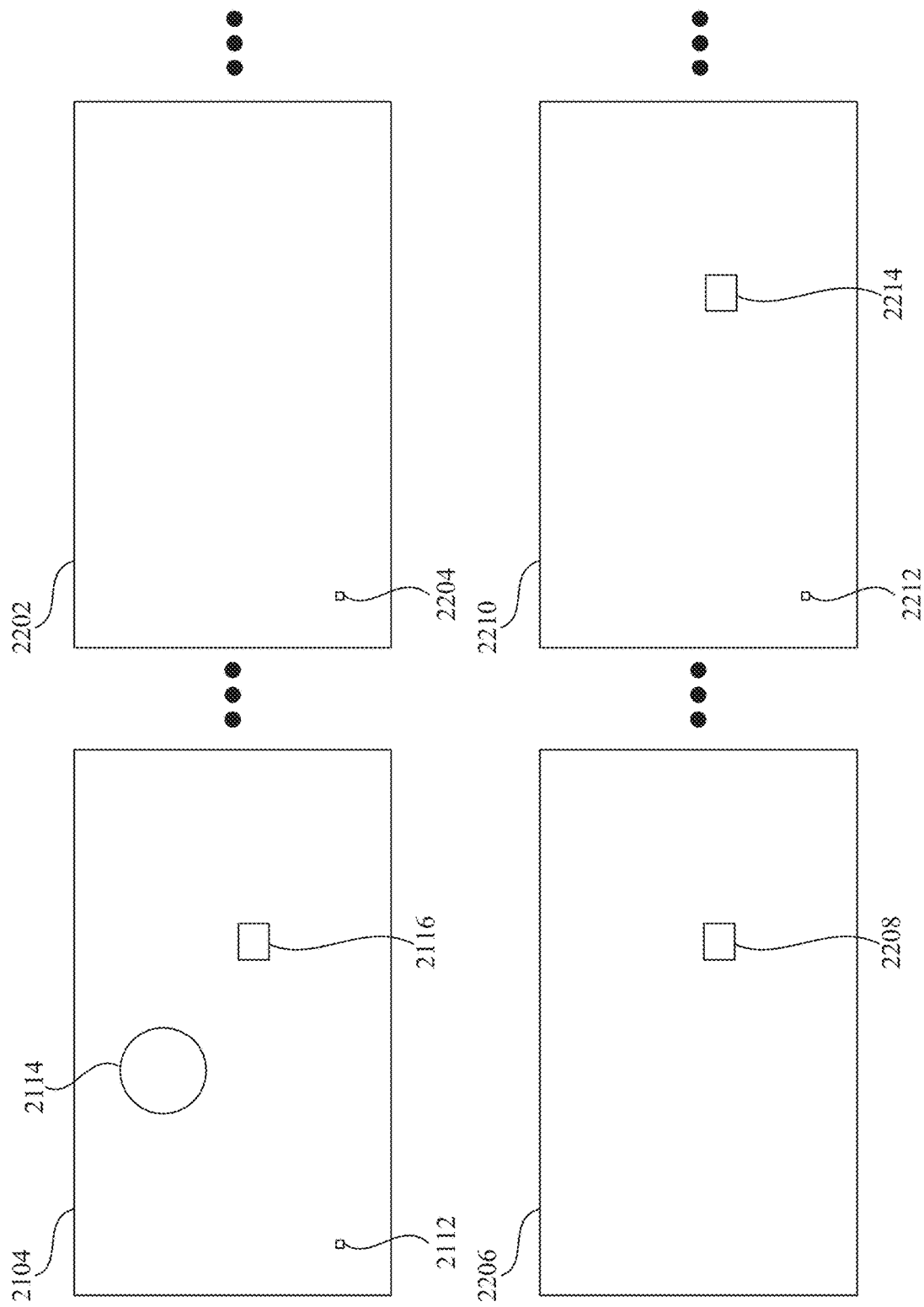
FIG. 22 is diagram illustrating, in the detecting step, an extracting step and a tracking step that eliminate areas which are not the first areas based on a blinking property in accordance with an embodiment of the present disclosure.

FIG. 22 is diagram illustrating, in the detecting step 356, the extracting step 2004 and the tracking step 2006 that eliminate areas which are not the first areas based on a blinking property in accordance with an embodiment of the present disclosure. In step 2004, at least one corresponding first bright area is extracted in each binarized frame, to obtain a position of each of the at least one corresponding first bright area. In the example in FIG. 22, in the binarized frame 2104, the areas 2112, 2114, and 2116 are first bright areas that are extracted. In a binarized frame 2202 subsequent to the binarized frame 2104, an area 2204 corresponding to a bright signal pulse of the first signal pulses of the invisible signal emitter 108 is a first bright area that is extracted. In a binarized frame 2206 subsequent to the binarized frame 2202, an area 2208 corresponding to a square area displayed by the smart TV is a first bright area that is extracted. In a binarized frame 2210 subsequent to the binarized frame 2206, areas 2212 and 2214 corresponding to a bright signal pulse of the first signal pulses of the invisible signal emitter 108 and a square area displayed by the smart TV are first bright areas that are extracted.

In step 2006, the position of each of the at least one corresponding first bright area is tracked such that each set of at least one set of bright and dark areas corresponding to the binarized frames and related in position is detected, wherein the at least one set of bright and dark areas include the first areas. In the example in FIG. 22, by tracking, the areas (e.g. 2112, 2204, and 2212) corresponding to the bright signal pulses of the first signal pulses of the invisible signal emitter 108 are found to be related in position. Based on positions of the areas 2112, 2204, and 2212, a first set of bright and dark areas corresponding to the binarized frames (e.g. 2104, 2202, 2206, and 2210) may be detected. A dark area in the first set of bright and dark areas is illustrated by disappearance of an area similar to the area (e.g. 2212) in, for example, the binarized frame 2206. By tracking, the areas (e.g. 2116, 2208, and 2214) corresponding to the square areas displayed by the smart TV are found to be related in position. Based on positions of the areas 2116, 2208, and 2214, a second set of bright and dark areas corresponding to the binarized frames (e.g. 2114, 2202, 2206, and 2210) may be detected. By tracking, the area 2114 corresponding to the circular area displayed by the smart TV is found to be not related in position with any area in each subsequent binarized frame (e.g. 2202, 2206, or 2210). Therefore, no set of bright and dark areas corresponding to the binarized frames (e.g. 2114, 2202, 2206, and 2210) is detected based on the position of the area 2114. Because the first set of bright and dark areas and the second set of bright and dark areas satisfy the blinking property, the first set of bright and dark areas and the second set of bright and dark areas are candidates for the first areas (e.g. 2112, 2204, and 2212) to be used to identify the data sequence. Because no set of bright and dark areas is detected for the area 2114 corresponding to the circular area displayed by the smart TV, based on the blinking property, the area 2114 is eliminated to be a candidate for the first areas (e.g. 2112, 2204, and 2212) to be used to identify the data sequence.

Figure 23:
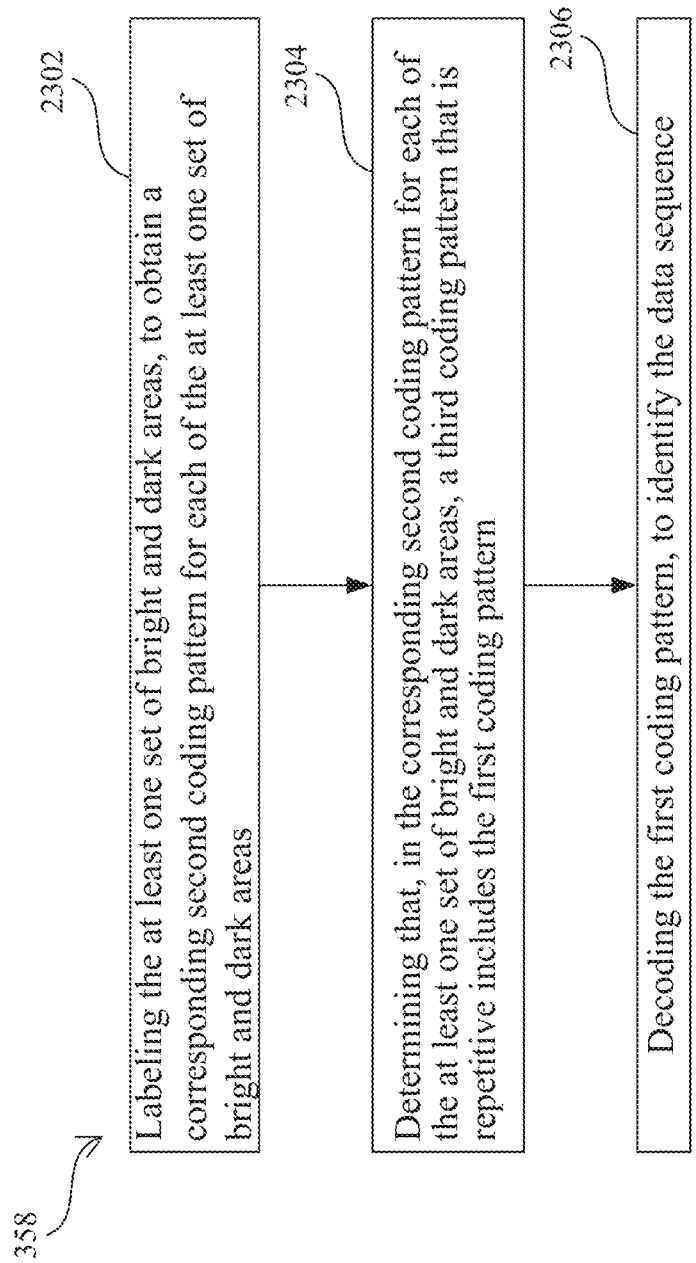
FIG. 23 is a flowchart illustrating a labeling and decoding step in the method for analyzing the first frames to obtain the data sequence in accordance with an embodiment of the present disclosure.

FIG. 23 is a flowchart illustrating the labeling and decoding step 358 in the method for analyzing the first frames to obtain the data sequence in accordance with an embodiment of the present disclosure. The step 358 includes the following steps. Referring to FIG. 23, in step 2302, the at least one set of bright and dark areas is labeled, to obtain a corresponding second coding pattern for each of the at least one set of bright and dark areas. In step 2304, that, in the corresponding second coding pattern for each of the at least one set of bright and dark areas, a third coding pattern that is repetitive includes the first coding pattern is determined. In step 2306, the first coding pattern is decoded, to identify the data sequence.

Figure 24:
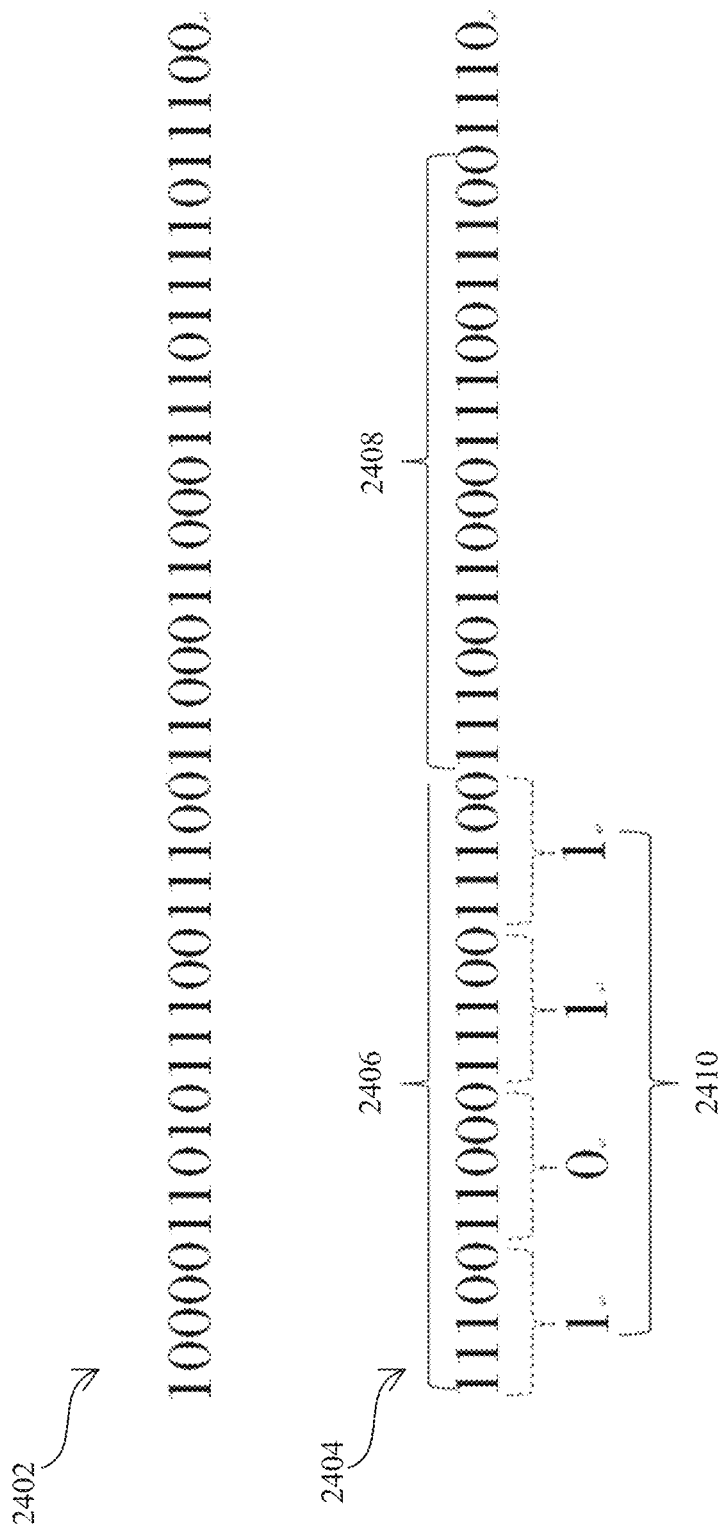
FIG. 24 is a diagram illustrating, in the labeling and decoding step, a labeling step and a determining step that eliminate areas which are not the first areas based on a repetitiveness property, and a decoding step in accordance with an embodiment of the present disclosure.

FIG. 24 is a diagram illustrating, in the labeling and decoding step 358, the labeling step 2302 and the determining step 2304 that eliminate areas which are not the first areas based on a repetitiveness property, and the decoding step 2306 in accordance with an embodiment of the present disclosure. In step 2302, the at least one set of bright and dark areas is labeled, to obtain a corresponding second coding pattern for each of the at least one set of bright and dark areas. The corresponding second coding pattern corresponds to a portion of the first frames having a predetermined duration such as 1 sec. In the example in FIG. 24, the second set of bright and dark areas described with reference to FIG. 22 is labeled, to obtain a second coding pattern 2402. The first set of bright and dark areas described with reference to FIG. 22 is labeled, to obtain a second coding pattern 2404. In step 2304, that, in the corresponding second coding pattern for each of the at least one set of bright and dark areas, that a third coding pattern that is repetitive includes the first coding pattern is determined. In the example in FIG. 24, the second coding pattern 2402 cannot be divided into portions such that some of the portions are repetitive. The second coding pattern 2404 can be divided into portions such that portions 2406 and 2408 of the portions are repetitive. Therefore, the second set of bright and dark areas is eliminated to be a candidate for the first areas to be used to identify the data sequence. The first set of bright and dark areas is the only candidate left for the first areas to be used to identify the data sequence. Hence, the portion 2406 or 2408 is the third coding pattern that includes the first coding pattern. In step 2306, the first coding pattern is decoded, to identify the data sequence. In the example in FIG. 24, the portion 2406 or 2408 is decoded, to identify the data sequence 2410.

Referring to FIG. 3, in step 360, the pairing request including the data sequence is sent to the sending device 100. In step 308, the pairing request is received from the receiving device 200. In step 310, the pairing request response is sent to the receiving device 200. In step 362, the pairing request response is received from the sending device 100. In step 364, the receiving device 200 is paired with the sending device based on the data sequence. In step 312, the sending device 200 is paired with the receiving device based on the data sequence. The communication method described with reference to FIGS. 3-24 is not only applicable in a situation where the receiving device 200 is not paired with any sending device, but also applicable in situations where the receiving device 200 is paired with a sending device and switches to be paired with the sending device 100, and where the receiving device 200 has been paired with the sending device 100, switches to be paired with another sending device, and then switches back to be paired with the sending device 100.

Some embodiments have one or a combination of the following features and/or advantages. By using a signal pulse rate substantially same as a camera frame rate for sampling to be successful, decreasing an exposure time interval for improving unsuccessful sampling and improving visibility of a portion of first areas in first frames, adjusting a white balance for the portion of the first areas to be more differentiable in color, autofocusing on a first invisible light signal emitter for the portion of the first areas to be focused on, analyzing the first frames based on brightness or color, a blinking property, and a repetitiveness property for areas which are not the first areas to be eliminated to be used to identify a data sequence, invisible light communication can be performed using a visible light camera.

A person having ordinary skill in the art understands that each of the units, modules, layers, blocks, algorithm, and steps of the system or the method described and disclosed in the embodiments of the present disclosure are realized using hardware, firmware, software, or a combination thereof. Whether the functions run in hardware, firmware, or software depends on the condition of application and design requirement for a technical plan. A person having ordinary skill in the art can use different ways to realize the function for each specific application while such realizations should not go beyond the scope of the present disclosure.

It is understood that the disclosed system, and method in the embodiments of the present disclosure can be realized with other ways. The above-mentioned embodiments are exemplary only. The division of the modules is merely based on logical functions while other divisions exist in realization. The modules may or may not be physical modules. It is possible that a plurality of modules are combined or integrated into one physical module. It is also possible that any of the modules is divided into a plurality of physical modules. It is also possible that some characteristics are omitted or skipped. On the other hand, the displayed or discussed mutual coupling, direct coupling, or communicative coupling operate through some ports, devices, or modules whether indirectly or communicatively by ways of electrical, mechanical, or other kinds of forms.

The modules as separating components for explanation are or are not physically separated. The modules are located in one place or distributed on a plurality of network modules. Some or all of the modules are used according to the purposes of the embodiments.

If the software function module is realized and used and sold as a product, it can be stored in a computer readable storage medium. Based on this understanding, the technical plan proposed by the present disclosure can be essentially or partially realized as the form of a software product. Or, one part of the technical plan beneficial to the conventional technology can be realized as the form of a software product. The software product is stored in a computer readable storage medium, including a plurality of commands for at least one processor of a system to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program instructions.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A communication method, comprising:
    performing a sending method by a sending device comprising a first invisible light signal emitter, wherein the sending method comprises:
        loading a signal pulse pattern encoded with a data sequence;
        scanning a camera frame rate broadcasted by a receiving device; and
        emitting, by the first invisible light signal emitter, first signal pulses at a signal pulse rate same as the camera frame rate, wherein the signal pulse pattern is repeated in the first signal pulses,
    performing a receiving method by the receiving device comprising a visible light camera module that is capable of capturing invisible light emitted by the first invisible light signal emitter, wherein the receiving method comprises:
        broadcasting the camera frame rate; and
        capturing, by the visible light camera module, a plurality of first frames at the camera frame rate with an exposure time interval of a shutter of the visible light camera module set to be within a single pulse period,
    wherein each first frame comprises a corresponding first area caused by a corresponding signal pulse of a first portion of the first signal pulses;
    the receiving method further comprising:
        detecting the corresponding first area in each first frame; and
        labeling the corresponding first area in each first frame, to obtain a first coding pattern corresponding to the signal pulse pattern, and decoding the first coding pattern, to identify the data sequence;
    wherein the receiving method further comprises the following steps before the step of capturing the first frames at the camera frame rate:
        capturing a second frame with the exposure time interval of the shutter of the visible light camera module; and
        decreasing the exposure time interval such that visibility of a third area in a third frame captured with the decreased exposure time interval is higher than the visibility of the second area,
    wherein the first frames are captured using the decreased exposure time interval.

2. The communication method of claim 1, wherein the decreased exposure time interval is decreased such that the visibility of the third area is highest.

3. The communication method of claim 1, wherein the receiving method further comprises the following steps before the step of capturing the first frames at the camera frame rate:
    adjusting a white balance of the visible light camera module such that a color of the invisible light emitted by the first invisible light signal emitter is more differentiable from a color of visible light similar to the color of the invisible light emitted by the first invisible light signal emitter at a neutral white balance.

4. The communication method of claim 3, wherein the invisible light emitted by the first invisible light signal emitter is infrared.

5. The communication method of claim 4, wherein the white balance is adjusted to a color temperature less than 3000K.

6. The communication method of claim 3, wherein step of detecting the corresponding first area in each first frame comprises:
    binarizing each first frame using a threshold within a vicinity of a set of pixel values of one pixel of one of the first areas, to obtain binarized frames, wherein the one of the first areas corresponds to a bright signal pulse of the first signal pulses, and the set of pixel values includes a color value;
    extracting at least one corresponding first bright area in each binarized frame, to obtain a position of each of the at least one corresponding first bright area; and
    tracking the position of each of the at least one corresponding first bright area such that each set of at least one set of bright and dark areas corresponding to the binarized frames and related in position is detected, wherein the at least one set of bright and dark areas comprise the first areas.

7. The communication method of claim 1, wherein the receiving method further comprises the following steps:
    before the step of capturing the first frames at the camera frame rate,
        capturing a plurality of second frames at the camera frame rate, wherein each second frame comprises a corresponding second area caused by a corresponding signal pulse of a second portion of the first signal pulses; and
        detecting the corresponding second area in each second frame, to obtain a position of the corresponding second area; and
    during the step of capturing the first frames at the camera frame rate,
        autofocusing on the first invisible light signal emitter when the first invisible light signal emitter emits the first portion of the first signal pulses by identifying the first invisible light signal emitter as a subject for subject tracking using the position of each of at least one second area of the second areas.

8. The communication method of claim 7, wherein
each second frame further comprises at least one corresponding third area corresponding to at least one other sending device, wherein each of at least one corresponding third area is caused by a corresponding signal pulse of second signal pulses emitted by a second invisible light signal emitter of a corresponding other sending device of the at least one other sending device, and the second signal pulses correspond to the second frames;
the step of detecting the corresponding second area in each second frame, to obtain a position of the corresponding second area comprises:
detecting the corresponding second area and the at least one corresponding third area in each second frame, to obtain a position of the corresponding second area and a position of each of the at least one corresponding third area; and
selecting to use the position of each of at least one second area of the second areas for autofocusing based on an area size of the second area in one of the second frames being the biggest among the second area and the at least one third area in the one of the second frames.

9. The communication method of claim 8, wherein step of detecting the corresponding second area in each second frame, to obtain a position of the corresponding second area further comprises:
counting a number of the second area and the at least one third area in the one of the second frames, to obtain a number of the sending device and the at least one other sending device; and
for each of the sending device and the at least one other sending device based on the number of the sending device and the at least one other sending device, averaging area sizes of a plurality of corresponding areas in the second frames, wherein each of the corresponding areas is one of the second area and the at least one third area in a corresponding third frame of the second frames, and the one of the second area and the at least one third area is caused by a bright signal pulse of the first signal pulses, or a bright signal pulse of the second signal pulses corresponding to one of the at least one third area.

10. The communication method of claim 8, wherein
each second frame further comprises a corresponding fourth area corresponding to a portion of the sending device not comprising the first invisible light signal emitter or a portion of any of the at least one other sending device not comprising the second invisible light signal emitter; and
before the step of detecting the corresponding second area in each second frame, to obtain a position of the corresponding second area, causing the corresponding second area in each second frame to be aligned with each other by aligning the corresponding fourth area in each second frame with each other.

11. The communication method of claim 7, wherein
each second frame further comprises a corresponding fourth area corresponding to a portion of the sending device not comprising the first invisible light signal emitter; and
before the step of detecting the corresponding second area in each second frame, to obtain a position of the corresponding second area, causing the corresponding second area in each second frame to be aligned with each other by aligning the corresponding fourth area in each second frame with each other.

12. The communication method of claim 1, wherein step of detecting the corresponding first area in each first frame comprises:
binarizing each first frame using a threshold within a vicinity of at least one pixel value of one pixel of one of the first areas, to obtain binarized frames, wherein the one of the first areas corresponds to a bright signal pulse of the first signal pulses;
extracting at least one corresponding first bright area in each binarized frame, to obtain a position of each of the at least one corresponding first bright area; and
tracking the position of each of the at least one corresponding first bright area such that each set of at least one set of bright and dark areas corresponding to the binarized frames and related in position is detected, wherein the at least one set of bright and dark areas comprise the first areas.

13. The communication method of claim 12, wherein the at least one pixel value is a brightness value.

14. The communication method of claim 12, wherein step of labeling the corresponding first area in each first frame, to obtain the first coding pattern corresponding to the signal pulse pattern, and decoding the first coding pattern, to identify the data sequence comprises:
labeling the at least one set of bright and dark areas, to obtain a corresponding second coding pattern for each of the at least one set of bright and dark areas; and
determining that, in the corresponding second coding pattern for each of the at least one set of bright and dark areas, a third coding pattern that is repetitive comprises the first coding pattern.

15. The communication method of claim 1, wherein when the first invisible light signal emitter emits the first signal pulses, the first invisible light signal emitter is not limited to emit the first signal pulses synchronously with timing at which the visible light camera module captures the first frames.

16. A communication method, comprising:
performing a receiving method by a receiving device comprising a visible light camera module that is capable of capturing invisible light emitted by a first invisible light signal emitter of a sending device, wherein the receiving method comprises:
broadcasting a camera frame rate;
capturing, by the visible light camera module, a plurality of first frames at the camera frame rate with an exposure time interval of a shutter of the visible light camera module set to be within a single pulse period, wherein each first frame comprises a corresponding first area caused by a corresponding signal pulse of a first portion of first signal pulses, and the first signal pulses are emitted by the first invisible light signal emitter at a signal pulse rate same as the camera frame rate;
detecting the corresponding first area in each first frame; and
labeling the corresponding first area in each first frame, to obtain a first coding pattern corresponding to a signal pulse pattern, and decoding the first coding pattern, to identify a data sequence,
the method further comprising:
performing a sending method by the sending device comprising the first invisible light signal emitter, wherein the sending method comprises:

loading the signal pulse pattern encoded with the data sequence;

scanning the camera frame rate broadcasted by the receiving device; and emitting, by the first invisible light signal emitter, the first signal pulses at the signal pulse rate, wherein the signal pulse pattern is repeated in the first signal pulses, wherein the invisible light emitted by the first invisible light signal emitter is infrared, wherein the receiving method further comprises the following steps before the step of capturing the first frames at the camera frame rate:

capturing a second frame with the exposure time interval of the shutter of the visible light camera module; and decreasing the exposure time interval such that visibility of a third area in a third frame captured with the decreased exposure time interval is higher than the visibility of the second area, wherein the first frames are captured using the decreased exposure time interval.

17. A communication system, comprising:

a receiving device, comprising:

a visible light camera module that is capable of capturing invisible light emitted by a first invisible light signal emitter of a sending device;

at least one first memory configured to store first program instructions; and at least one first processor configured to execute the first program instructions, which cause a receiving method to be performed, wherein the receiving method comprises:

broadcasting a camera frame rate;

capturing, by the visible light camera module, a plurality of first frames at the camera frame rate with an exposure time interval of a shutter of the visible light camera module set to be within a single pulse period, wherein each first frame comprises a corresponding first area caused by a corresponding signal pulse of a first portion of first signal pulses, and the first signal pulses are emitted by the first invisible light signal emitter at a signal pulse rate same as the camera frame rate;

detecting the corresponding first area in each first frame; and labeling the corresponding first area in each first frame, to obtain a first coding pattern corresponding to a signal pulse pattern, and decoding the first coding pattern, to identify a data sequence, wherein the receiving method further comprises the following steps before the step of capturing the first frames at the camera frame rate:

capturing a second frame with the exposure time interval of the shutter of the visible light camera module; and decreasing the exposure time interval such that visibility of a third area in a third frame captured with the decreased exposure time interval is higher than the visibility of the second area, wherein the first frames are captured using the decreased exposure time interval, the communication system further comprising the sending device, comprising:

the first invisible light signal emitter;

at least one second memory configured to store second program instructions; and at least one second processor configured to execute the second program instructions, which cause a sending method to be performed, wherein the sending method comprises:

loading the signal pulse pattern encoded with the data sequence;

scanning the camera frame rate broadcasted by the receiving device; and emitting, by the first invisible light signal emitter, the first signal pulses at the signal pulse rate, wherein the signal pulse pattern is repeated in the first signal pulses.

* * * * *